United States Patent
Gramunt et al.

(10) Patent No.: US 9,886,396 B2
(45) Date of Patent: Feb. 6, 2018

(54) SCALABLE EVENT HANDLING IN MULTI-THREADED PROCESSOR CORES

(71) Applicant: Intel Corporation, Santa Clara, CA (US)

(72) Inventors: Roger Gramunt, Portland, OR (US); Rammohan Padmanabhan, Beaverton, OR (US); Ramon Matas, Portland, OR (US); Neal S. Moyer, Hillsboro, OR (US); Benjamin C. Chaffin, Portland, OR (US); Avinash Sodani, Portland, OR (US); Alexey P. Suprun, Beaverton, OR (US); Vikram S. Sundaram, Beaverton, OR (US); Chung-Lun Chan, Hillsboro, OR (US); Gerardo A. Fernandez, Beaverton, OR (US); Julio Gago, Barcelona (ES); Michael S. Yang, Hillsboro, OR (US); Aditya Kesiraju, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 14/581,285

(22) Filed: Dec. 23, 2014

(65) Prior Publication Data

US 2016/0179533 A1 Jun. 23, 2016

(51) Int. Cl.

| | |
|---|---|
| G06F 9/30 | (2006.01) |
| G06F 9/44 | (2006.01) |
| G06F 12/12 | (2016.01) |
| G06F 12/122 | (2016.01) |
| G06F 9/48 | (2006.01) |
| G06F 9/38 | (2006.01) |

(52) U.S. Cl.
CPC ............ *G06F 12/122* (2013.01); *G06F 9/384* (2013.01); *G06F 9/3851* (2013.01); *G06F 9/3855* (2013.01); *G06F 9/3859* (2013.01); *G06F 9/4806* (2013.01); *G06F 2212/62* (2013.01)

(58) Field of Classification Search
CPC ...... G06F 9/384; G06F 9/3851; G06F 9/3855; G06F 9/3859; G06F 9/4418; G06F 9/4806; G06F 9/485; G06F 12/122; G06F 12/123; G06F 2212/62
USPC .................................. 712/218; 711/133–136
See application file for complete search history.

(56) References Cited

U.S. PATENT DOCUMENTS

| 2003/0105911 A1* | 6/2003 | Jones ...................... G06F 13/36 710/309 |
| 2004/0268098 A1* | 12/2004 | Almog .................. G06F 9/3808 712/227 |

(Continued)

*Primary Examiner* — Daniel Pan
(74) *Attorney, Agent, or Firm* — Nicholson De Vos Webster & Elliott LLP

(57) ABSTRACT

In one embodiment, a processor includes a frontend unit having an instruction decoder to receive and to decode instructions of a plurality of threads, an execution unit coupled to the instruction decoder to receive and execute the decoded instructions, and an instruction retirement unit having a retirement logic to receive the instructions from the execution unit and to retire the instructions associated with one or more of the threads that have an instruction or an event pending to be retired. The instruction retirement unit includes a thread arbitration logic to select one of the threads at a time and to dispatch the selected thread to the retirement logic for retirement processing.

15 Claims, 16 Drawing Sheets

(56) References Cited

U.S. PATENT DOCUMENTS

2006/0206693 A1* 9/2006 Segelken ............ G06F 9/30014
712/218
2011/0029978 A1* 2/2011 Smolens ............... G06F 9/5016
718/103

* cited by examiner

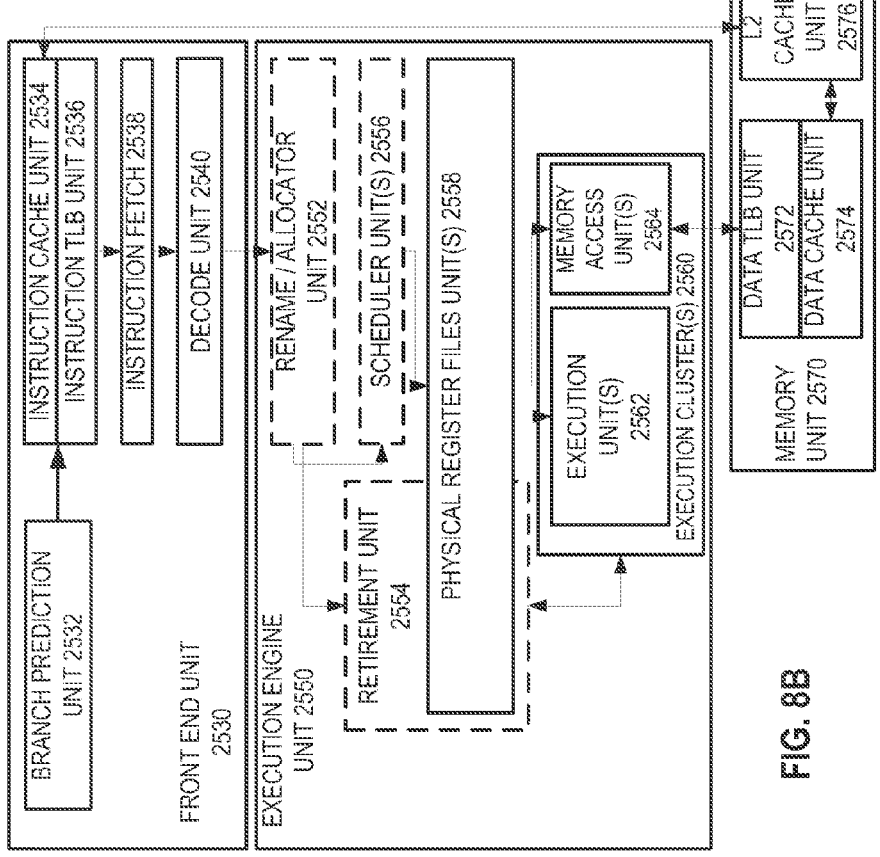
FIG. 8A
FIG. 8B

SCALABLE EVENT HANDLING IN MULTI-THREADED PROCESSOR CORES

TECHNICAL FIELD

Embodiments of the present invention relate generally to multi-threaded processors. More particularly, embodiments of the invention relate to scalable event handling of multi-threaded processor cores.

BACKGROUND ART

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. A processor or integrated circuit typically comprises a single processor die, where the processor die may include any number of processing elements, such as cores, threads, and/or logical processors.

Increasingly, multithreading is supported in hardware. For instance, in one approach, processors in a multi-processor system, such as a chip multiprocessor ("CMP") system, may each act on one of the multiple software threads concurrently. In another approach, referred to as simultaneous multithreading ("SMT"), a single physical processor is made to appear as multiple logical processors to operating systems and user programs. For SMT, multiple software threads can be active and execute simultaneously on a single processor without switching. That is, each logical processor maintains a complete set of the architecture state, but many other resources of the physical processor, such as caches, execution units, branch predictors, control logic and buses are shared. For SMT, the instructions from multiple software threads thus execute concurrently on each logical processor.

Processors have to deal with a variety of events, such as, for example, faults, traps, assists interrupts, and dedicate a good amount of logic to that. That logic becomes more complicated if the processor is an out-of-order processor and supports SMT. Every cycle cores can potentially have to process a significant number of events. They are both internal (usually related to execution of instructions) or external (e.g., interrupts). A conventional multi-threaded processor supports 2-way SMT and has deployed solutions for the same problems. But it was based on logic that was either not blindly scalable to a larger number of threads or incurred in significant logic replication. For example, event evaluation and prioritizations was done for all threads in parallel. This requires replication of the event logic for each of the threads. The logic looks at "what the other thread is doing" and assumes only 2 threads are present in the system (e.g., a computer system or electronic device), for example, in deciding whether to initiate an event process if a thread is sleeping by checking if the other thread has finished the exclusive access of certain processing resources (e.g., global registers).

BRIEF DESCRIPTION OF THE DRAWINGS

Embodiments of the invention are illustrated by way of example and not limitation in the figures of the accompanying drawings in which like references indicate similar elements.

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

DESCRIPTION OF THE EMBODIMENTS

Figure 1:
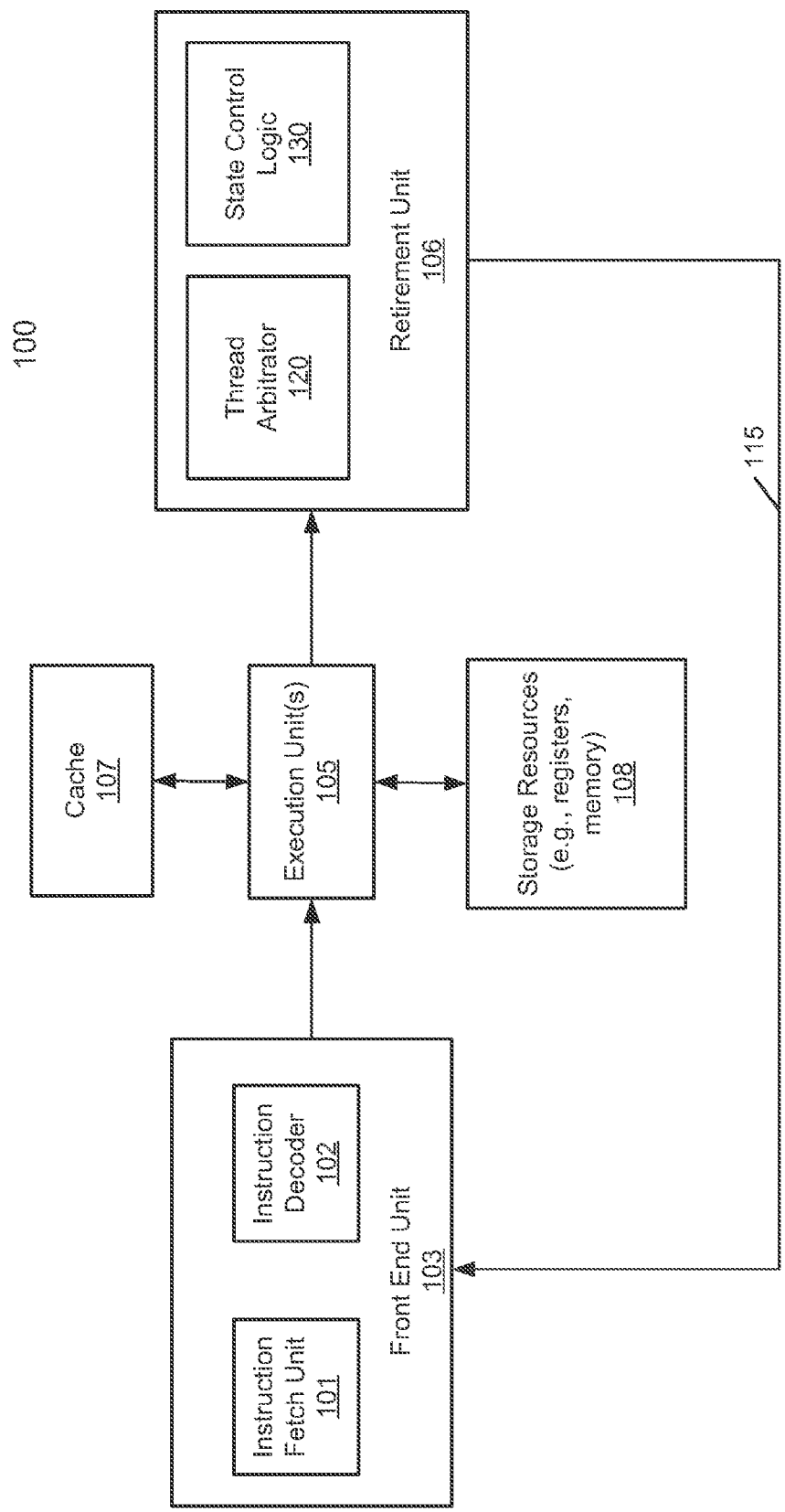
FIG. 1 is a block diagram of an execution pipeline of a processor or processor core according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a thread arbitrator (also referred to as a thread selector) is utilized at the beginning of a retirement unit or pipeline that takes into account all threads that might need to use the event logic or retirement pipeline. Specifically, it needs to take into account threads that might have micro-operations (uops) ready to retire as well as threads with break events (external or internal) pending. The selected thread will win the right to start using the retirement pipeline on the next cycle. In addition, a least-recently-used (LRU) mechanism is utilized by or integrated with the thread arbitrator to ensure that a thread with events pended or uops ready to retire will be selected once in a predetermined number of cycles, such as, for example, at least N cycles (where N represents the number of threads in the machine with instructions ready to retire of events pended).

Although certain interfaces to a programmable interrupt controller (PIC) and other units, such as the source of break events, may need to be replicated, in the very first stage of the retirement pipeline, the ones for the selected thread are multiplexed and injected into retirement logic of the retirement pipeline. In one embodiment, all the pipeline stages in the retirement pipeline after that are threaded (thread-selected) pipeline stages. No per thread logic replication is needed. All that is needed is a thread identifier (ID) that moves along the pipeline stages of the retirement pipeline. This requires minimal logic replication and very few and contained changes to single threaded logic. On a later pipeline stage of the retirement pipeline the event vector shipped to a front-end unit (also referred to as front end cluster or FEC) of the processor or processor core and a nuke (e.g., flush, cleaning) signal is delivered to the rest of the processor core. Both are tagged with a thread ID. Also, if the event taken requires a complete flush of the machine, then an all-thread nuke (AT-nuke, also referred to as AT-flush or AT-cleaning) protocol is started.

According to one embodiment, during the AT-nuke protocol cycle for a particular thread, the front end processing of instructions of that particular thread is suspended. In addition, at least some or all other threads are given an opportunity to perform the necessary operations to flush for the respective thread, before resuming the processing of instructions of the thread that causes the AT-nuke protocol. A state control logic (also referred to as an AT-nuke logic or unit) is adapted to detect and monitor the states of all threads during the AT-nuke protocol transaction to make sure that all threads enter and complete the AT-nuke protocol process. In one embodiment, a virtual event is posted to each of the threads and the virtual event is monitored when such virtual event traverses the retirement pipeline, until each virtual event reaches a predetermined state of the AT-nuke protocol. After all threads enter and complete the AT-nuke transaction, the front end restarts processing the instructions of the threads. As a result, a large number of threads can be processed and serialized in the retirement pipeline stage and the number of threads can be easily scaled due to the multiplexed thread selection or thread arbitration logic and the AT-nuke protocol, without having to replicating the retirement logic for each of the large number of threads.

FIG. 1 is a block diagram of a processor or processor core according to one embodiment of the invention. Referring to FIG. 1, processor 100 may represent any kind of instruction processing apparatuses or processing elements. A processing element refers to a thread, a process, a context, a logical processor, a hardware thread, a core, and/or any processing element, which shares access to other shared resources of the processor, such as reservation units, execution units, pipelines, and higher level caches/memory. A physical processor typically refers to an integrated circuit, which potentially includes any number of other processing elements, such as cores or hardware threads. A core often refers to logic located on an integrated circuit capable of maintaining an independent architectural state, where each independently maintained architectural state is associated with at least some dedicated execution resources. In one embodiment, processor 100 may be a general-purpose processor. Processor 100 may be any of various complex instruction set computing (CISC) processors, various reduced instruction set computing (RISC) processors, various very long instruction word (VLIW) processors, various hybrids thereof, or other types of processors entirely. Processor 100 may also represent one or more processor cores.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a central processing unit (CPU) including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

In one embodiment, processor 100 includes, but is not limited to, a front end unit 103 having instruction fetch unit 101 and instruction decoder 102, one or more execution units 105, and retirement unit 106, forming a processor pipeline. A pipeline or portion of a pipeline, such as a front-end or instruction decode portion 102 of the pipeline, can be shared by multiple threads. Architecture state registers (not shown) are replicated, so individual architecture states/contexts are capable of being stored for different logical processors. Other smaller resources, such as instruction pointers and renaming logic in rename allocator logic (not shown) may also be replicated for the threads. Some resources, such as re-order buffers in a reorder/retirement unit 106, load/store buffers, and queues may be shared through partitioning. While resources, such as general purpose internal registers (e.g., registers 108), page-table base registers, a low-level data-cache (e.g., cache 107) and data translation buffer (TLB), execution unit(s) 104, and an out-of-order unit (not shown) may be potentially fully shared.

In one embodiment, instruction decoder 102 is to decode the instructions received from instruction fetch unit 101. The instructions may be macroinstructions fetched from cache memory 107 that is integral within processor 100 or closely associated therewith, or may be retrieved from an external memory via a system bus. Instruction decoder 102 may decode the macroinstructions and generate or output one or more micro-operations, micro-code, entry points, microinstructions, other instructions, or other control signals, which reflect, or are derived from, the instructions. Instruction decoder 102 may be implemented using various different mechanisms. Examples of suitable mechanisms include, but are not limited to, microcode read only memories (ROMs), look-up tables, hardware implementations, programmable logic arrays (PLAs), and the like.

In one embodiment, processor 100 may further includes an allocator and rename unit that may include an allocator to reserve resources, such as register files to store instruction processing results. However, a thread is potentially capable of an out-of-order execution, where the allocator and rename unit also reserves other resources, such as reorder buffers to track instruction results. It may also include a register renamer to rename program/instruction reference registers to other registers internal to the processor. During such a renaming stage, references to external or logical registers are converted into internal or physical register references to eliminate dependencies caused by register reuse.

Processor 100 may further include a scheduler and dispatch unit to schedule and dispatch instructions to execution units 105 for execution. In fact, instructions/operations are potentially scheduled on execution units 105 according to their type availability. For example, a floating point instruction is scheduled on a port of an execution unit that has an available floating point execution unit. Examples of execution units include a floating point execution unit, an integer execution unit, a jump execution unit, a load execution unit, a store execution unit, and other known execution units.

Execution units 105, which may include an arithmetic logic unit, or another type of logic unit capable of performing operations based on instructions. As a result of instruction decoder 102 decoding the instructions, execution unit 105 may receive one or more micro-operations, micro-code entry points, microinstructions, other instructions, or other control signals, which reflect, or are derived from, the instructions. Execution unit 105 may be operable as a result of instructions indicating one or more source operands (SRC) and to store a result in one or more destination operands (DEST) of a register set indicated by the instructions. Execution unit 105 may include circuitry or other execution logic (e.g., software combined with hardware and/or firmware) operable to execute instructions or other control signals derived from the instructions and perform an operation accordingly. Execution unit 105 may represent any kinds of execution units such as logic units, arithmetic logic units (ALUs), arithmetic units, integer units, etc. In one embodiment, retirement unit 106 includes components, such as the reorder buffers mentioned above, load buffers, and store buffers, to support out-of-order execution and later in-order retirement of instructions executed out-of-order.

Some or all of the source and destination operands may be stored in storage resources 108 such as registers of a register set or memory. A register set may be part of a register file, along with potentially other registers, such as status registers, flag registers, etc. A register may be a storage location or device that may be used to store data. The register set may often be physically located on die with the execution unit(s). The registers may be visible from the outside of the processor or from a programmer's perspective. For example, instructions may specify operands stored in the registers. Various different types of registers are suitable, as long as they are capable of storing and providing data as described herein. The registers may or may not be renamed. Examples of suitable registers include, but are not limited to, dedicated physical registers, dynamically allocated physical registers using register renaming, combinations of dedicated and dynamically allocated physical registers, etc. Alternatively, one or more of the source and destination operands may be stored in a storage location other than a register, such as, for example, a location in system memory.

In one embodiment, cache 107 includes a variety of cache such as a high level and/or low level cache. Higher-level or further-out cache caches recently fetched and/or operated on elements. Note that higher-level or further-out refers to cache levels increasing or getting further way from the execution unit(s). In one embodiment, the higher-level cache is a second-level data cache. However, the higher level cache is not so limited, as it may be or include an instruction cache, which may also be referred to as a trace cache. A trace cache may instead be coupled after a decoder to store recently decoded instructions. It also potentially includes a branch target buffer to predict branches to be executed or taken, and an instruction-translation buffer (I-TLB) to store address translation entries for instructions.

Lower level data cache and data translation buffer (D-TLB) may be coupled to an execution unit(s). The data cache stores recently used/operated on elements, such as data operands, which are potentially held in memory coherency states, such as modified, exclusive, shared, and invalid (MESI) states. The D-TLB stores recent virtual/linear to physical address translations. Previously, a D-TLB entry includes a virtual address, a physical address, and other information, such as an offset, to provide inexpensive translations for recently used virtual memory addresses.

Processor 100 further includes a bus interface unit (not shown). A bus interface unit communicates with devices external to a processor, such as system memory, a chipset, a northbridge, or other integrated circuit. The memory may be dedicated to the processor or shared with other devices in a system. Examples of the memory includes dynamic random access memory (DRAM), static RAM (SRAM), non-volatile memory (NV memory), and long-term storage. Typically the bus interface unit includes input/output (I/O) buffers to transmit and receive bus signals on an interconnect. Examples of the interconnect include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol. The bus interface unit may also communicate with a higher level cache.

In one embodiment, the various stages described above can be organized into three phases. The first phase can be referred to as an in-order front end including a fetch stage, a decode stage, and an allocate/rename stage. During the in-order front end phase, the instructions proceed through the pipeline 100 in their original program order. The second phase can be referred to as the out-of-order execution phase including a schedule/dispatch stage and an execution stage. During this phase, each instruction may be scheduled, dispatched and executed as soon as its data dependencies are resolved and the execution unit is available, regardless of its sequential position in the original program. The third phase, referred to as the in-order retirement phase which includes the retirement unit 106 in which instructions are retired in their original, sequential program order to preserve the integrity and semantics of the program, and to provide a precise interrupt model.

According to one embodiment, retirement unit or retirement pipeline stage 106 includes a thread arbitrator or thread selection logic 120 and a state control logic 130. Thread arbitrator 120 is utilized at the beginning of retirement unit or pipeline 106 to serialize and retire instructions of multiple threads. Thread arbitrator 120 takes into account all threads that might need to use retirement pipeline 106. Specifically, thread arbitrator 120 takes into account threads that might have micro-operations (uops) ready to retire as well as threads with break events (external or internal) pending. The selected thread will win the right to start using the retirement pipeline 106 on the next cycle. In addition, a least-recently-used (LRU) mechanism (not shown) may be utilized by or integrated with the thread arbitrator 120 to ensure that a thread with events pended or uops ready to retire will be selected once in a predetermined number of cycles. For example, a thread may be selected after pending for at least N cycles, where N represents the number of threads in the machine with instructions ready to retire of events pended.

Although certain interfaces to a programmable interrupt controller (PIC) and other units, such as the source of break events, may need to be replicated, in the very first stage of the retirement pipeline, the ones for the selected thread are multiplexed and injected into retirement logic of the retirement pipeline 106. In one embodiment, all the stages in the retirement pipeline after that are threaded (thread-selected) pipeline stages. No per thread logic replication is needed. All that is needed is a thread ID that moves along the pipeline stages of the retirement pipeline 106. This requires minimal logic replication and very few and contained changes to single threaded logic. On a later pipeline stage of the retirement pipeline 106 the event vector shipped to a front-end unit 103 via path 115 of the processor or processor core 100 and a nuke (e.g., flush, cleaning) signal is delivered to the rest of the processor core. Both are tagged with a thread ID. Also, if the event taken requires a complete flush of the machine, then an all-thread nuke (AT-nuke, also referred to as AT-flush or AT-cleaning) protocol is started by state control logic 130.

According to one embodiment, during the AT-nuke protocol cycle for a particular thread, the front end processing of instructions of that particular thread is suspended, for example, by sending a suspend signal via path 115. In addition, at least some or all other threads are given an opportunity to perform the necessary operations to flush for the respective thread, before resuming the processing of instructions of the thread that causes the AT-nuke protocol. In one embodiment, during the early stages of the AT-nuke protocol the front-end processing is suspended for any thread that nukes; once the AT-nuke protocol has storied, every time that a thread is nuked, the FEC processing is stalled for that thread. All threads are affected. State control logic 130 is adapted to detect and monitor the states of all threads during the AT-nuke protocol transaction to make sure that all threads enter and complete the AT-nuke protocol process. In one embodiment, a virtual event is posted to each of the threads and the virtual event is monitored when such virtual event traverses the retirement pipeline, until each virtual event reaches a predetermined state of the AT-nuke protocol. After all threads enter and complete the AT-nuke transaction, the front end restarts processing the instructions of the threads. As a result, a large number of threads can be processed and serialized in the retirement pipeline stage and the number of threads can be easily scaled due to the multiplexed thread selection or thread arbitration logic and the AT-nuke protocol, without having to replicating the retirement logic for each of the large number of threads.

Figure 2A:
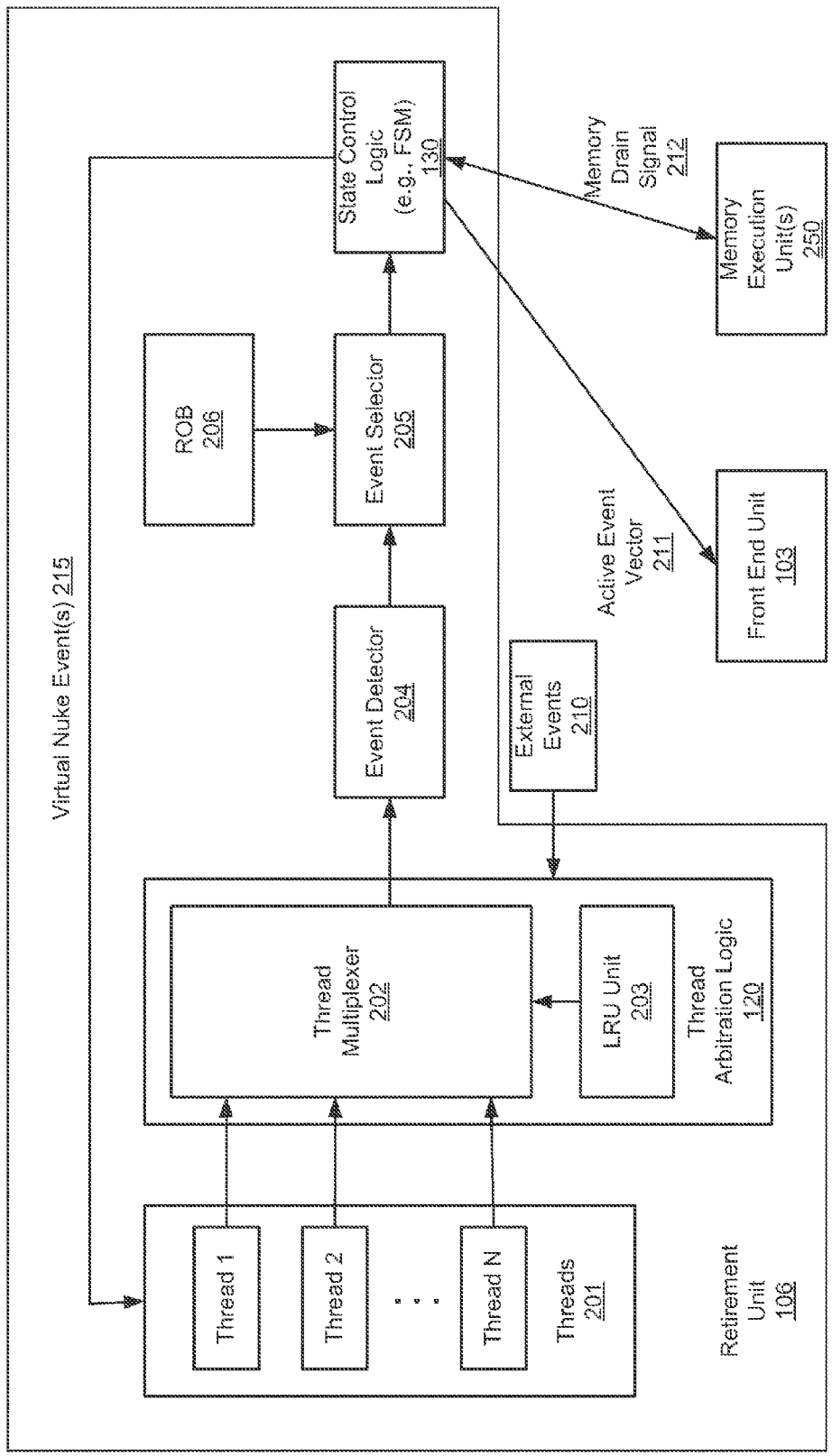
FIGS. 2A and 2B are block diagrams illustrating a retirement pipeline stage according to some embodiments.

FIG. 2A is a block diagram illustrating a retirement pipeline stage according to one embodiment. Referring to FIG. 2A, retirement unit 106 includes thread arbitration logic 120 having thread multiplexer 202 and LRU unit 203, event detector 204, event selector 205, state control logic 130, as well as other retirement logic such as reorder buffer (ROB) 206, etc. These retirement logics may represent different retirement stages of retirement pipeline 106. When operations are performed on data within an execution unit (e.g., execution unit 105), results may be provided to retirement logic, such as reorder buffer 206. More specifically, ROB 206 may include various arrays and logic to receive information associated with instructions that are executed. This information is then examined by ROB 206 to determine whether the instructions can be validly retired and result data committed to the architectural state of the processor core, or whether one or more exceptions occurred that prevent a proper retirement of the instructions. According to one embodiment, thread arbitration logic 120 receives multiple threads 201 and to serialize threads 201 to be processed by downstream retirement logic such as event detector 204 and event selector 205. All of these retirement logics are adapted to process all of threads 201 in a serialized manner, without having to replicate the same logic for different threads. For example, certain event detection logic, event prioritization logic, and event processing logic may not be replicated, while some other logic such as control registers and retirement states may still be replicated.

According to one embodiment, in response to multiple threads 201, thread multiplexer 202 selects one of threads 201 based on a variety of selection schemes or rules, such as for example, based on thread priorities or in a round robin fashion. In one embodiment, thread arbitration logic 120 further includes LRU unit 203 to maintain pending status of threads 201, such as, for example, how long each of the pending threads has been pending since received at thread arbitration logic 120. LRU unit 203 may include an LRU table having multiple entries, each corresponding to one of threads 201. Each entry may store a thread ID and a time stamp representing when the corresponding thread was received. The entries of LRU table may be sorted based on the time stamp, such that a thread that has been pending for the longest time will have a higher priority to be dispatched in next cycle. In one embodiment, each entry may store a thread ID and a time stamp representing when the corresponding thread was received. The entries of LRU table may be sorted based on the time stamp, such that a thread that has been pending for the longest time will have a higher priority to be dispatched in next cycle. This logic is implemented without any timestamp, the only information needed is to remember or record in which order the threads have been selected in the past. For example the LRU logic will simply store: {2,3,0,1} meaning that 2 was the most recently selected, then 3, then 0 and 1 is the one that has been more time without being selected. Then if at some point there are two threads ready (let's say 2 and 0 for example), the thread arbitrator will use this LRU logic to select amongst them (pick thread 0 in the example since it has been waiting more than 3). After that the LRU is updated (to {0, 2, 3, 1} in the example).

In one embodiment, LRU unit 203 causes thread multiplexer 202 to ensure selecting one of threads 201 if the thread has been pending for more than a predetermined processing cycles. In a particular embodiment, LRU unit 203 causes thread multiplexer 202 to select one of threads 201 if the thread has been pending for N processing cycles, where N represents the number of threads 201. In a normal thread arbitration process, the threads may be selected based on a predetermined thread arbitration scheme or rules (e.g., characteristics, status, or priorities). However, a thread that has not been selected but has been pending for a while will be selected within a predetermined period of time represented by processing cycles, regardless its priority, etc. In such a configuration a thread will not be starved, for example, because of its priority.

After a thread has been selected by thread arbitration logic 120, the thread will be processed by downstream retirement logics, such as event detector 204 and event selector 205, in a serial manner, which is referred to a threaded retirement pipeline stages. The retirement logics process all of threads 201 and optionally obtain the necessary associated thread information from other components of the retirement unit 106 based on their thread IDs, such as, for example, ROB 206. As a result, there is no need to replicate a majority of the retirement logics (e.g., event detector 204, event selector or prioritize logic 205) for different threads as required by a conventional retirement pipeline.

Some of threads 201 may be associated with certain events, which may be internal events or external events (e.g., interrupts). Different types of event may be processed differently by retirement unit 106. Some events may require all other threads or other components of the processor or processor core to flush or cleanup their operations or data. Such events are referred to herein as all-thread (AT) nuke (AT-nuke), AT-flush, or AT-cleanup events. For example, if a particular thread needs to access a global register (e.g., control register) that are shared by all other threads, the other threads need to flush their operations before this particular thread can access the global register. Another example is when one thread (or logical processor) needs to modify the state of another thread. Both this and the global register example boils down to a thread needing to modify state outside of it's own scope. Furthermore, waking thread up or putting thread to sleep are events that require an AT nuke. An awake (or active thread) is a thread that the processor is actively fetching, decoding, executing, and retiring instructions. Sleep or inactive threads are not even fetched.

According to one embodiment, event detector 204 detects that a thread being processed at a point in time includes an AT-nuke event (referred to herein as an AT-nuke thread). Event detector 204 sends a signal to event selector or priority logic 205 indicating such an event. There may be multiple threads that require an AT-nuke operation. Event selector 205 selects one of the threads having an AT-nuke event based on an event selection scheme or rules (not shown). In one embodiment, event selection scheme includes enumeration or round-robin of active (or participating) threads. In one embodiment, the thread arbitrator is unaware whether an event needs to be processed as an AT-nuke event or just as a regular thread specific event. It simply detects it as a thread having pended events (or instructions ready to be retired), that is enough to consider that thread for thread selection. In one embodiment, event selector 205 selects an AT-nuke thread and passes the thread information (e.g., thread ID) to state control logic 130. In response, state control logic 130 initiate an AT-nuke protocol to inform all other threads to flush their operations and to wait for all other threads to complete the AT-nuke protocol, including sending a virtual nuke event to the remaining threads via path 215, sending a signal to front end unit 103 to suspend processing instructions of the AT-nuke thread and sending a signal to memory execution unit 250 to drain, etc. Once all of the threads enter the AT-nuke protocol, an active event vector is recomputed and sent to front end unit 103 to restart instruction processing.

Figure 2B:
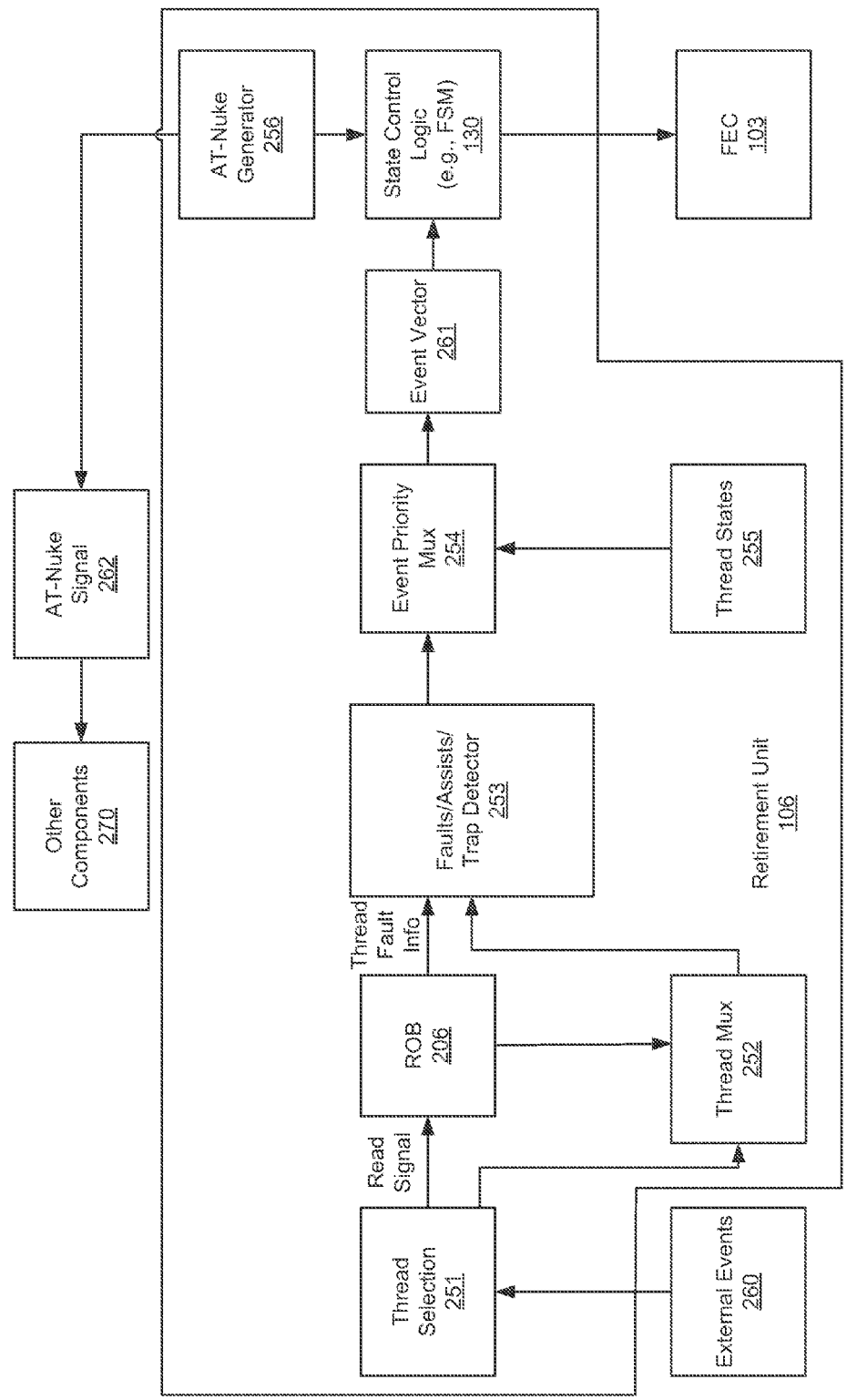

FIG. 2B is a block diagram illustrating a retirement pipeline of a processor core according to another embodiment of the invention. Referring to FIG. 2B, retirement unit 106 includes, amongst others, thread selector 251, ROB unit 206, thread multiplexer 252, fault, assist, or trap detector 253, event priority multiplexer 254, and state control logic 130. Thread selector 251 and thread multiplexer 252 may be implemented as part of thread arbitration logic 120. According to one embodiment, in response to an external event as part of external events 260, dependent upon the type of the event of a particular thread (identified by a thread ID), thread selector 251 sends a read signal (with a thread ID) to ROB unit 206 to read thread fault information of the thread.

In response to the signal, ROB unit 206 reads the requested information of the thread from a ROB buffer and sends the retrieved thread information to fault/assist/trap detector 253, which may be implemented as part of event detector 204 of FIG. 2A. Meanwhile, thread selector 251 causes thread multiplexer to select one of the threads that have an external event pending and to send the thread arbitration information to detector 253. Detector 253 determines which of those threads have an AT-nuke event and passes the information to event priority multiplexer to select one of the AT-nuke threads (if there are multiple ones). In response, event priority multiplexer performs a thread lookup operation (e.g., AT-nuke lookup) in thread state table 255 and to recomputed active event vector 261. The active event vector is then communicated to front end unit 103 for processing subsequent instructions.

If there is an AT-nuke thread detected, according to one embodiment, state control logic 130, which may be a finite state machine or FSM, starts the AT-nuke protocol. In one embodiment, state control logic 130 causes AT-nuke signal generator 256 to generate AT-nuke signal 262 and to send AT-nuke signal 262 to other components of the processor core. In one embodiment, the AT-nuke signal is sent to any component that needs to do some dynamic repartitioning of resources based on the number of active threads in the processor, such as, for example, reorder buffer allocation logic, store buffer allocation logic, prefetch buffer allocation logic, and request buffer allocation logic etc. In one embodiment, in response to an AT-nuke thread, state control logic 130 posts a virtual nuke event to all other threads to start the AT-nuke protocol. The virtual event of each of the remaining threads causes the virtual event to be processed by traversing through all stages of retirement unit 106. State control logic 130 monitors the virtual nuke event of each of the remaining threads to enter and complete various states of the AT-nuke protocol, before instructing front end unit 103 to process (e.g., start sequencing) instructions of the AT-nuke thread, which will be described in details further below.

Figure 3:
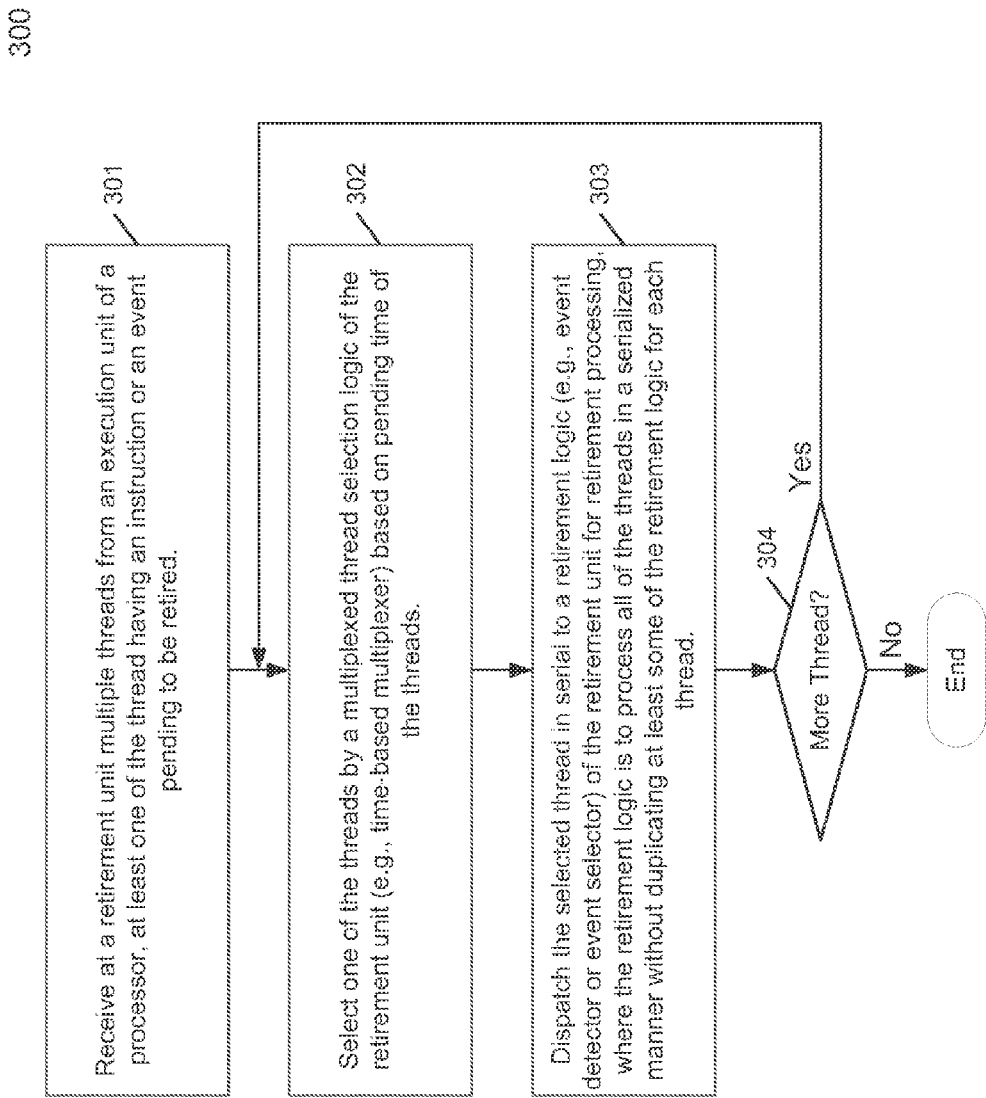
FIG. 3 is a flow diagram illustrating a process of a retirement pipeline of a processor core according to one embodiment of the invention.

FIG. 3 is a flow diagram illustrating a process of a retirement pipeline of a processor core according to one embodiment of the invention. Process 300 may be performed by processing logic that may include hardware, software, or a combination thereof. For example, process 300 may be performed by retirement unit 106. Referring to FIG. 3, at block 301, a retirement unit or retirement pipeline receives instructions of multiple threads from an execution unit or execution pipeline. At least one of the threads includes an instruction or event pending to be retired. At block 302, a multiplexed thread arbitration logic of the retirement unit is adapted to serialize by selecting one of the threads one at a time. At block 303, the selected thread is then dispatched to a retirement logic of the retirement pipeline for retirement processing. The retirement logic processes all the threads in a serialized manner without having to duplicate at least some of the retirement logic for each thread. At block 304, if it is determined whether there is more thread to be processed, if so, the above operations may be iteratively performed.

Figure 4:
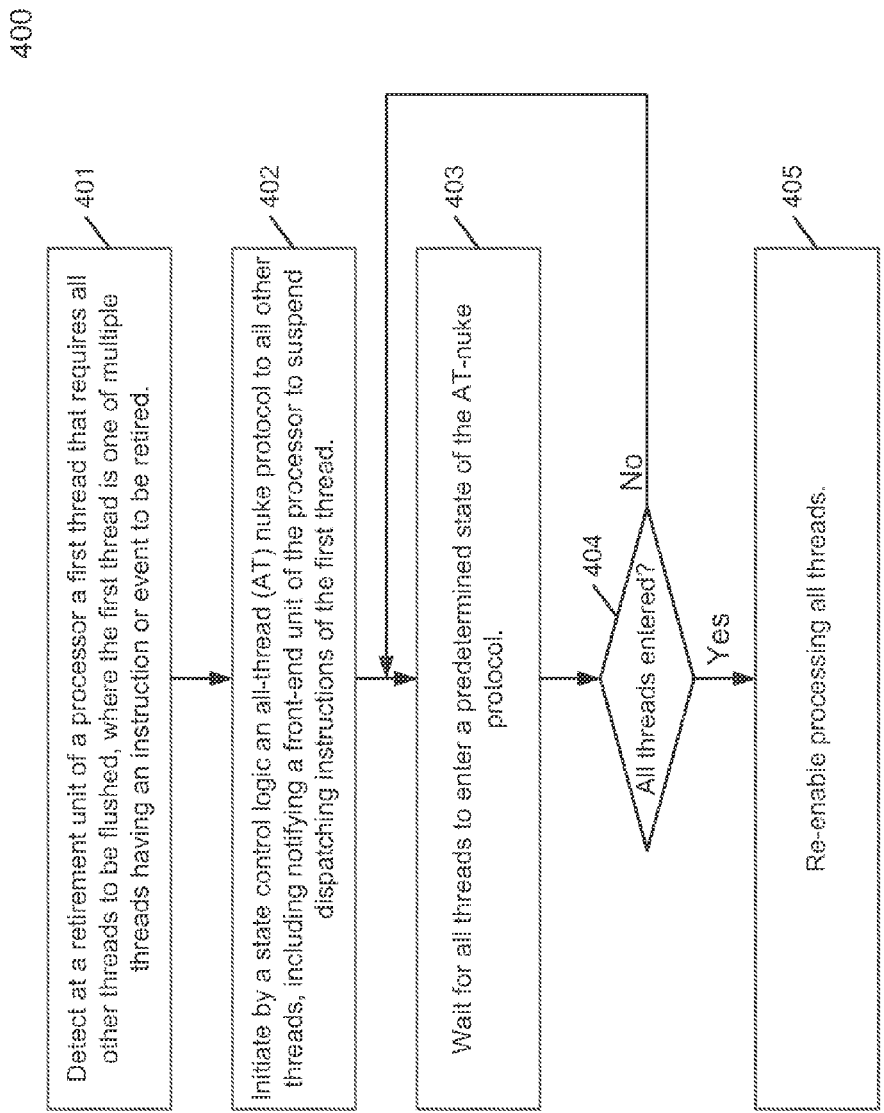
FIG. 4 is a flow diagram illustrating a process of a retirement pipeline of a processor core according to another embodiment of the invention.

FIG. 4 is a flow diagram illustrating a process of a retirement pipeline of a processor core according to another embodiment of the invention. Process 400 may be performed by processing logic that may include hardware, software, or a combination thereof. For example, process 400 may be performed by retirement unit 106. Referring to FIG. 4, at block 401, processing logic detects a first thread that is an AT-nuke thread requiring all other threads and/or other components of the processor core to flush their operations. The first thread is one of the multiple threads that have either an instruction or an event pending to be retired. At block 402, processing logic initiates the AT-nuke protocol. During the AT-nuke protocol, processing logic posts a virtual nuke event to all other threads to inform those threads to perform a flush operation to whatever they are doing. Processing logic further sends a suspension signal to the front end unit of the processor core to temporarily halt the processing of instructions for the first thread. Specifically, processing logic informs an instruction sequencer to stop sequencing the instructions of the first thread. At block 403, processing logic monitors the virtual nuke events of the threads traversing through different stages of the retirement pipeline until all threads have entered and reached a predetermined state of the AT-nuke protocol at block 404. After all threads have entered and reached the predetermined state of the AT-nuke protocol, at block 405, the processing of instructions at the front end of the processor core is re-enabled.

Figure 5:
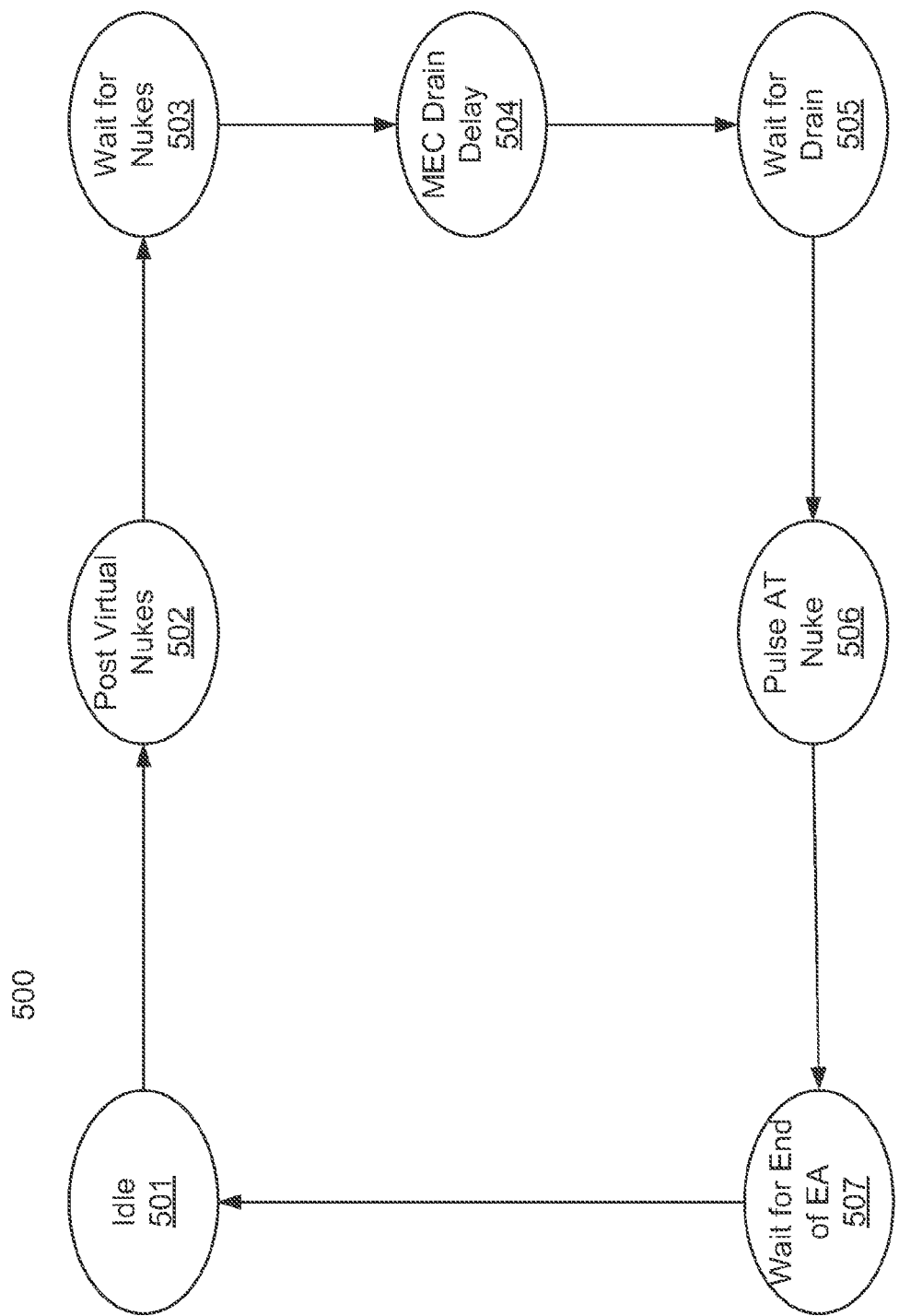
FIG. 5 is a block diagram illustrating certain states of the AT-nuke protocol according to one embodiment of the invention.

FIG. 5 is a block diagram illustrating certain states of the AT-nuke protocol according to one embodiment of the invention. States 500 may be monitored and controlled by state control logic 130. Referring to FIG. 5, states 501-507 represent various states within a complete cycle of an AT-nuke protocol. When an AT-nuke thread is detected, for example, by event detector 204 of FIG. 2A or fault/assist/trap detector 253 of FIG. 2B, state control logic 130 starts the AT-nuke protocol by transitioning from idle state 501 to post virtual nuke state 502 and posting a virtual nuke event to the remaining threads other than the AT-nuke thread. Virtual nuke events are events with no architectural side effects. The virtual nuke events can force all threads to be selected, for example, by thread arbitration logic 120 and cause an event vector to be sent to front end unit 103 for all active threads. In one embodiment, a virtual event has the lowest priority amongst all events.

Once the virtual nuke events are posted, the protocol transitions from state 502 to state 503 waiting for all threads join the AT-nuke. In order for a thread to join the AT-nuke, according to one embodiment, the thread has to be selected by the thread arbitration logic 120, traverse through the retirement pipeline, and finally takes an event (e.g., virtual event or an actual event). If a thread joins the AT-nuke with an actual event and a virtual event, the virtual event will be dropped. According to one embodiment, while at state 503, a signal is sent to front end unit 103 asking front end unit 103 to refrain from processing (e.g., sequencing) further instructions of the AT-nuke thread. The event evaluation window for the AT-nuke thread is closed and no more event will be evaluated for the AT-nuke thread.

Once all threads join the AT-nuke, the protocol transitions from state 503 to state 504, in which a memory drain signal is sent to a memory execution unit or cluster to instruct the memory execution unit to drain any memory transactions. In an out-of-order processor, it is very common that memory transactions are still active after a thread is nuked or flushed. Once the memory drain signal is sent, the protocol transitions from state 504 to state 505 to wait for the memory drain operation completes, which may take one or more processing cycles. When a signal is received from the memory execution unit indicating that the memory drain operation has been completed, a new thread active vector is recomputed, because some events may cause a thread to wake up or go to sleep. The thread active vector is used by many components or logics within the processor core. Thereafter, the protocol transitions from state 505 to state 506 by pulsing an AT-nuke signal.

While at state 506, a signal is sent to the front end unit to request the front end unit to restart processing (e.g., sequencing) the instruction of the active threads. The protocol then transitions from state 506 to state 507. The active threads are processed sequentially one at a time, for example, from a lower thread ID to a higher thread ID. The uops are sequenced out of the micro-sequencer until a uop with the end-of-exclusive-access flow marker retires. When the highest active thread retires a uop with an end-of-exclusive-access flow marker is detected, the event windows for the non-active threads (e.g., sleeping threads) are opened and the AT-nuke protocol is completed, and the protocol ends back to state 501.

Figure 6:
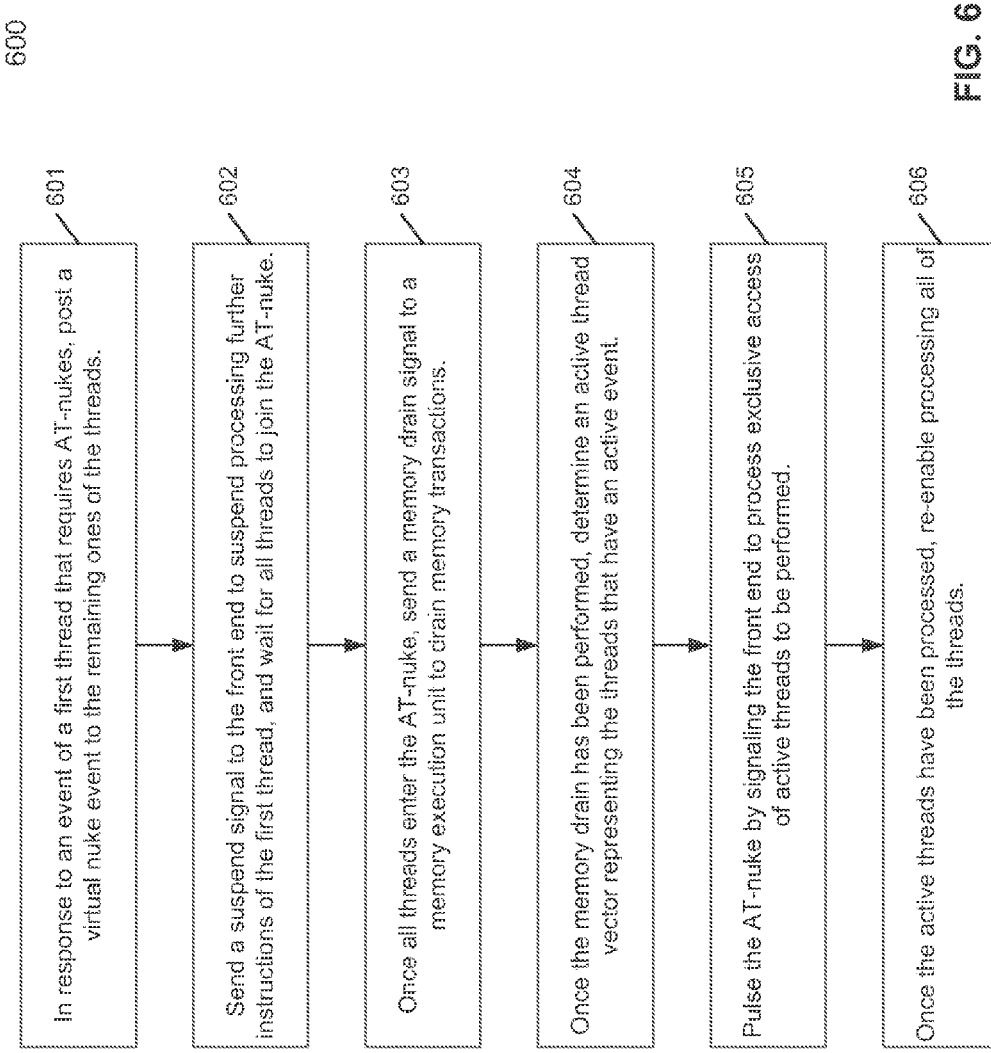
FIG. 6 is a flow diagram illustrating a process of AT-nuke protocol according to one embodiment of the invention.

FIG. 6 is a flow diagram illustrating a process of AT-nuke protocol according to one embodiment of the invention. Process 600 may be performed by processing logic that may include hardware, software, or a combination thereof. For example, process 600 may be performed by state control logic 130. Referring to FIG. 6, at block 601, in response to an event of a first thread that requires AT-nukes, processing logic posts a virtual nuke event to all other threads. At block 602, processing logic sends a suspend signal (e.g., by holding do_not_sequence line high) to the front end unit to suspend processing further instructions of the first thread, and wait for all threads to join the AT-nuke. Once all threads join the AT-nuke, at block 603, processing logic sends a memory drain signal to a memory execution unit to drain any memory transaction (e.g., inflight transaction). At block 604, once the memory drain has been completed, an active thread vector is recomputed. At block 605, the processing logic pulses the AT-nuke by signaling the front end unit to process exclusive access of the active threads. At block 606, processing of all threads as usual is re-enabled.

Figure 7:
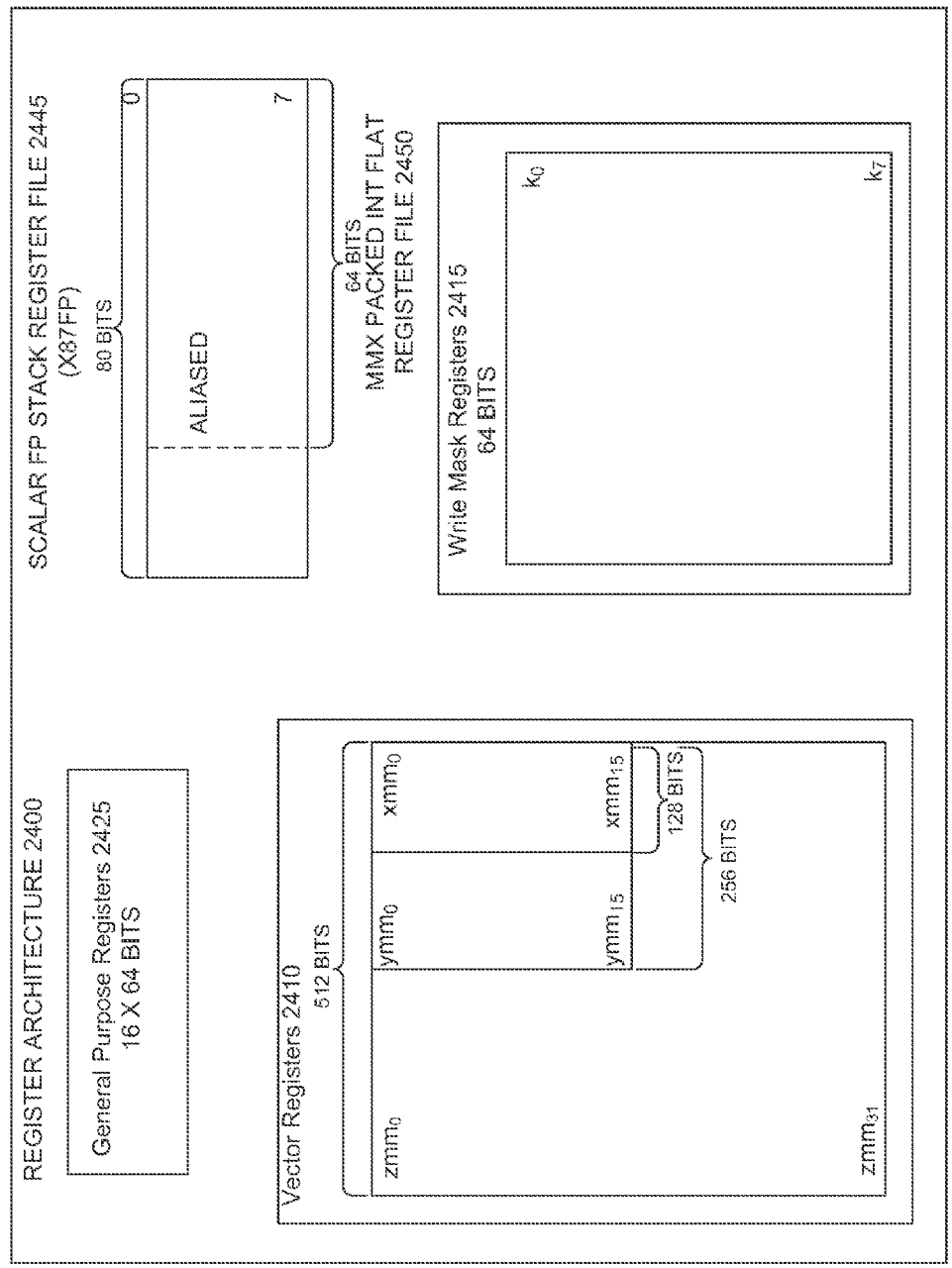
FIG. 7 is a block diagram of register architecture according to one embodiment of the invention.

FIG. 7 is a block diagram of a register architecture 2400 according to one embodiment of the invention. In the embodiment illustrated, there are 32 vector registers 2410 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 2300 operates on these overlaid register file as illustrated in the below tables.

| Adjustable Vector Length | Class | Operations | Registers |
| --- | --- | --- | --- |
| Instruction Templates that do not include the vector length field 2259B | A (FIG. 8A; U = 0) | 2210, 2215, 2225, 2230 | zmm registers (the vector length is 64 byte) |
| | B (FIG. 8B; U = 1) | 2212 | zmm registers (the vector length is 64 byte) |

-continued

| Adjustable Vector Length | Class | Operations | Registers |
|---|---|---|---|
| Instruction Templates that do include the vector length field 2259B | B (FIG. 8B; U = 1) | 2217, 2227 | zmm, ymm, or xmm registers (the vector length is 64 byte, 32 byte, or 16 byte) depending on the vector length field 2259B |

In other words, the vector length field 2259B selects between a maximum length and one or more other shorter lengths, where each such shorter length is half the length of the preceding length; and instructions templates without the vector length field 2259B operate on the maximum vector length. Further, in one embodiment, the class B instruction templates of the specific vector friendly instruction format 2300 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 2415—in the embodiment illustrated, there are 8 write mask registers (k0 through k7), each 64 bits in size. In an alternate embodiment, the write mask registers 2415 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 2425—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 2445, on which is aliased the MMX packed integer flat register file 2450—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 2500 includes a fetch stage 2502, a length decode stage 2504, a decode stage 2506, an allocation stage 2508, a renaming stage 2510, a scheduling (also known as a dispatch or issue) stage 2512, a register read/memory read stage 2514, an execute stage 2516, a write back/memory write stage 2518, an exception handling stage 2522, and a commit stage 2524.

FIG. 8B shows processor core 2590 including a front end unit 2530 coupled to an execution engine unit 2550, and both are coupled to a memory unit 2570. The core 2590 may be a reduced instruction set computing (RISC) core, a complex instruction set computing (CISC) core, a very long instruction word (VLIW) core, or a hybrid or alternative core type. As yet another option, the core 2590 may be a special-purpose core, such as, for example, a network or communication core, compression engine, coprocessor core, general purpose computing graphics processing unit (GPGPU) core, graphics core, or the like.

The front end unit 2530 includes a branch prediction unit 2532 coupled to an instruction cache unit 2534, which is coupled to an instruction translation lookaside buffer (TLB) 2536, which is coupled to an instruction fetch unit 2538, which is coupled to a decode unit 2540. The decode unit 2540 (or decoder) may decode instructions, and generate as an output one or more micro-operations, micro-code entry points, microinstructions, other instructions, or other control signals, which are decoded from, or which otherwise reflect, or are derived from, the original instructions. The decode unit 2540 may be implemented using various different mechanisms. Examples of suitable mechanisms include, but are not limited to, look-up tables, hardware implementations, programmable logic arrays (PLAs), microcode read only memories (ROMs), etc. In one embodiment, the core 2590 includes a microcode ROM or other medium that stores microcode for certain macroinstructions (e.g., in decode unit 2540 or otherwise within the front end unit 2530). The decode unit 2540 is coupled to a rename/allocator unit 2552 in the execution engine unit 2550.

The execution engine unit 2550 includes the rename/allocator unit 2552 coupled to a retirement unit 2554 and a set of one or more scheduler unit(s) 2556. The scheduler unit(s) 2556 represents any number of different schedulers, including reservations stations, central instruction window, etc. The scheduler unit(s) 2556 is coupled to the physical register file(s) unit(s) 2558. Each of the physical register file(s) units 2558 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc.

In one embodiment, the physical register file(s) unit 2558 comprises a vector registers unit, a write mask registers unit, and a scalar registers unit. These register units may provide architectural vector registers, vector mask registers, and general purpose registers. The physical register file(s) unit(s) 2558 is overlapped by the retirement unit 2554 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 2554 and the physical register file(s) unit(s) 2558 are coupled to the execution cluster(s) 2560.

The execution cluster(s) 2560 includes a set of one or more execution units 2562 and a set of one or more memory access units 2564. The execution units 2562 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions.

The scheduler unit(s) 2556, physical register file(s) unit(s) 2558, and execution cluster(s) 2560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 2564). It should also be understood that where separate pipelines are used, one or more of these pipelines may be out-of-order issue/execution and the rest in-order.

The set of memory access units 2564 is coupled to the memory unit 2570, which includes a data TLB unit 2572 coupled to a data cache unit 2574 coupled to a level 2 (L2) cache unit 2576. In one exemplary embodiment, the memory access units 2564 may include a load unit, a store address unit, and a store data unit, each of which is coupled to the data TLB unit 2572 in the memory unit 2570. The instruction cache unit 2534 is further coupled to a level 2 (L2) cache unit 2576 in the memory unit 2570. The L2 cache unit 2576 is coupled to one or more other levels of cache and eventually to a main memory.

By way of example, the exemplary register renaming, out-of-order issue/execution core architecture may implement the pipeline 2500 as follows: 1) the instruction fetch 2538 performs the fetch and length decoding stages 2502 and 2504; 2) the decode unit 2540 performs the decode stage 2506; 3) the rename/allocator unit 2552 performs the allocation stage 2508 and renaming stage 2510; 4) the scheduler unit(s) 2556 performs the schedule stage 2512; 5) the physical register file(s) unit(s) 2558 and the memory unit 2570 perform the register read/memory read stage 2514; the execution cluster 2560 perform the execute stage 2516; 6) the memory unit 2570 and the physical register file(s) unit(s) 2558 perform the write back/memory write stage 2518; 7) various units may be involved in the exception handling stage 2522; and 8) the retirement unit 2554 and the physical register file(s) unit(s) 2558 perform the commit stage 2524.

The core 2590 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 2590 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 2534/2574 and a shared L2 cache unit 2576, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 9B:
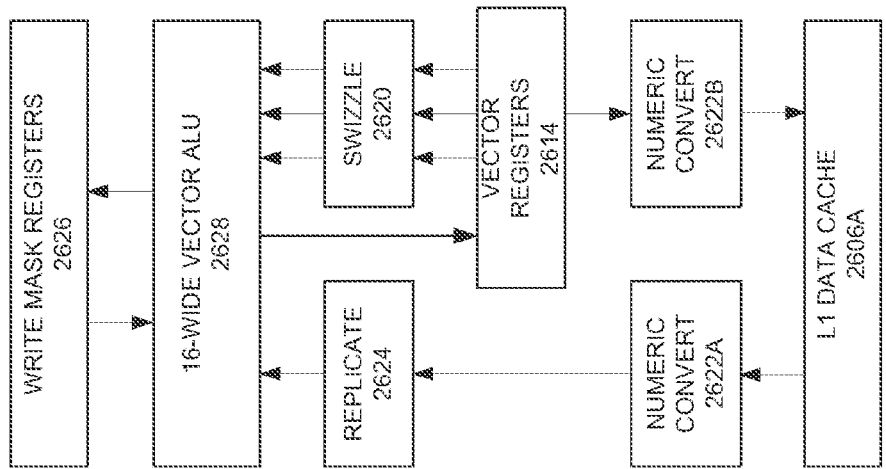
FIG. 9B is a block diagram of a processor core according to another embodiment of the invention.
Figure 9A:
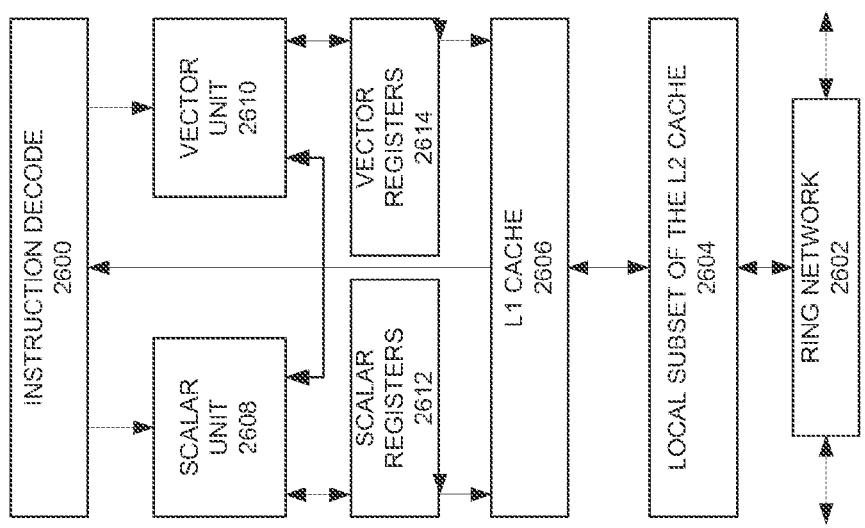
FIG. 9A is a block diagram of a processor core according to one embodiment of the invention.

FIG. 9A and FIG. 9B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 2602 and with its local subset of the Level 2 (L2) cache 2604, according to embodiments of the invention. In one embodiment, an instruction decoder 2600 supports the x86 instruction set with a packed data instruction set extension. An L1 cache 2606 allows low-latency accesses to cache memory into the scalar and vector units. While in one embodiment (to simplify the design), a scalar unit 2608 and a vector unit 2610 use separate register sets (respectively, scalar registers 2612 and vector registers 2614) and data transferred between them is written to memory and then read back in from a level 1 (L1) cache 2606, alternative embodiments of the invention may use a different approach (e.g., use a single register set or include a communication path that allow data to be transferred between the two register files without being written and read back).

The local subset of the L2 cache 2604 is part of a global L2 cache that is divided into separate local subsets, one per processor core. Each processor core has a direct access path to its own local subset of the L2 cache 2604. Data read by a processor core is stored in its L2 cache subset 2604 and can be accessed quickly, in parallel with other processor cores accessing their own local L2 cache subsets. Data written by a processor core is stored in its own L2 cache subset 2604 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 2606A part of the L1 cache 2604, as well as more detail regarding the vector unit 2610 and the vector registers 2614. Specifically, the vector unit 2610 is a 16-wide vector processing unit (VPU) (see the 16-wide ALU 2628), which executes one or more of integer, single-precision float, and double-precision float instructions. The VPU supports swizzling the register inputs with swizzle unit 2620, numeric conversion with numeric convert units 2622A-B, and replication with replication unit 2624 on the memory input. Write mask registers 2626 allow predicating resulting vector writes.

Figure 10:
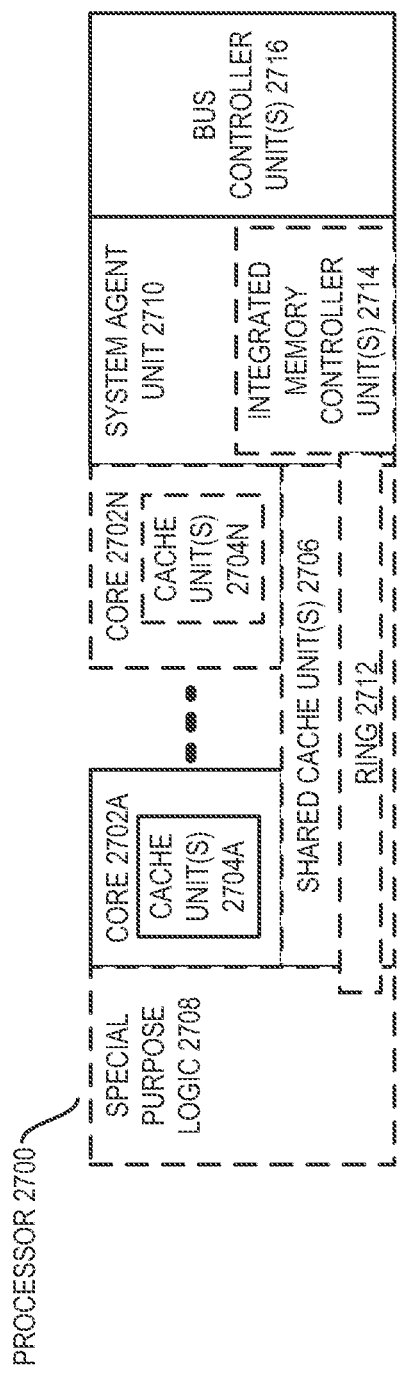
FIG. 10 is a block diagram of a processor according to embodiments of the invention.

FIG. 10 is a block diagram of a processor 2700 that may have more than one core, may have an integrated memory controller, and may have integrated graphics according to embodiments of the invention. The solid lined boxes in FIG. 10 illustrate a processor 2700 with a single core 2702A, a system agent 2710, a set of one or more bus controller units 2716, while the optional addition of the dashed lined boxes illustrates an alternative processor 2700 with multiple cores 2702A-N, a set of one or more integrated memory controller unit(s) 2714 in the system agent unit 2710, and special purpose logic 2708.

Thus, different implementations of the processor 2700 may include: 1) a CPU with the special purpose logic 2708 being integrated graphics and/or scientific (throughput) logic (which may include one or more cores), and the cores 2702A-N being one or more general purpose cores (e.g., general purpose in-order cores, general purpose out-of-order cores, a combination of the two); 2) a coprocessor with the cores 2702A-N being a large number of special purpose cores intended primarily for graphics and/or scientific (throughput); and 3) a coprocessor with the cores 2702A-N being a large number of general purpose in-order cores. Thus, the processor 2700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 2700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 2706, and external memory (not shown) coupled to the set of integrated memory controller units 2714. The set of shared cache units 2706 may include one or more mid-level caches, such as level 2 (L2), level 3 (L3), level 4 (L4), or other levels of cache, a last level cache (LLC), and/or combinations thereof. While in one embodiment a ring based interconnect unit 2712 interconnects the integrated graphics logic 2708, the set of shared cache units 2706, and the system agent unit 2710/integrated memory controller unit(s) 2714, alternative embodiments may use any number of well-known techniques for interconnecting such units. In one embodiment, coherency is maintained between one or more cache units 2706 and cores 2702-A-N.

In some embodiments, one or more of the cores 2702A-N are capable of multithreading. The system agent 2710 includes those components coordinating and operating cores 2702A-N. The system agent unit 2710 may include for example a power control unit (PCU) and a display unit. The PCU may be or include logic and components needed for regulating the power state of the cores 2702A-N and the integrated graphics logic 2708. The display unit is for driving one or more externally connected displays.

The cores 2702A-N may be homogenous or heterogeneous in terms of architecture instruction set; that is, two or more of the cores 2702A-N may be capable of execution the same instruction set, while others may be capable of executing only a subset of that instruction set or a different instruction set.

FIG. 11 to FIG. 15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
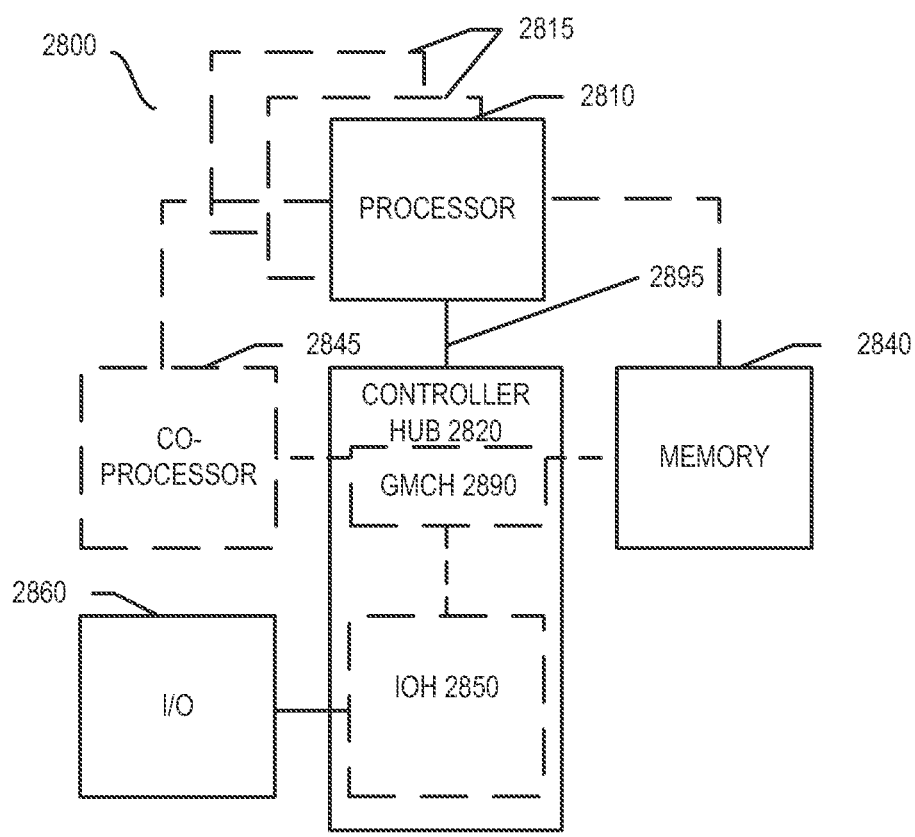
FIG. 11 is a block diagram of a system in accordance with one embodiment of the invention.

Referring now to FIG. 11, shown is a block diagram of a system 2800 in accordance with one embodiment of the present invention. The system 2800 may include one or more processors 2810, 2815, which are coupled to a controller hub 2820. In one embodiment the controller hub 2820 includes a graphics memory controller hub (GMCH) 2890 and an Input/Output Hub (IOH) 2850 (which may be on separate chips); the GMCH 2890 includes memory and graphics controllers to which are coupled memory 2840 and a coprocessor 2845; the IOH 2850 is couples input/output (I/O) devices 2860 to the GMCH 2890. Alternatively, one or both of the memory and graphics controllers are integrated within the processor (as described herein), the memory 2840 and the coprocessor 2845 are coupled directly to the processor 2810, and the controller hub 2820 in a single chip with the IOH 2850.

The optional nature of additional processors 2815 is denoted in FIG. 11 with broken lines. Each processor 2810, 2815 may include one or more of the processing cores described herein and may be some version of the processor 2700.

The memory 2840 may be, for example, dynamic random access memory (DRAM), phase change memory (PCM), or a combination of the two. For at least one embodiment, the controller hub 2820 communicates with the processor(s)

2810, 2815 via a multi-drop bus, such as a frontside bus (FSB), point-to-point interface such as QuickPath Interconnect (QPI), or similar connection 2895.

In one embodiment, the coprocessor 2845 is a special-purpose processor, such as, for example, a high-throughput MIC processor, a network or communication processor, compression engine, graphics processor, GPGPU, embedded processor, or the like. In one embodiment, controller hub 2820 may include an integrated graphics accelerator.

There can be a variety of differences between the physical resources 2810, 2815 in terms of a spectrum of metrics of merit including architectural, microarchitectural, thermal, power consumption characteristics, and the like.

In one embodiment, the processor 2810 executes instructions that control data processing operations of a general type. Embedded within the instructions may be coprocessor instructions. The processor 2810 recognizes these coprocessor instructions as being of a type that should be executed by the attached coprocessor 2845. Accordingly, the processor 2810 issues these coprocessor instructions (or control signals representing coprocessor instructions) on a coprocessor bus or other interconnect, to coprocessor 2845. Coprocessor(s) 2845 accept and execute the received coprocessor instructions.

Figure 12:
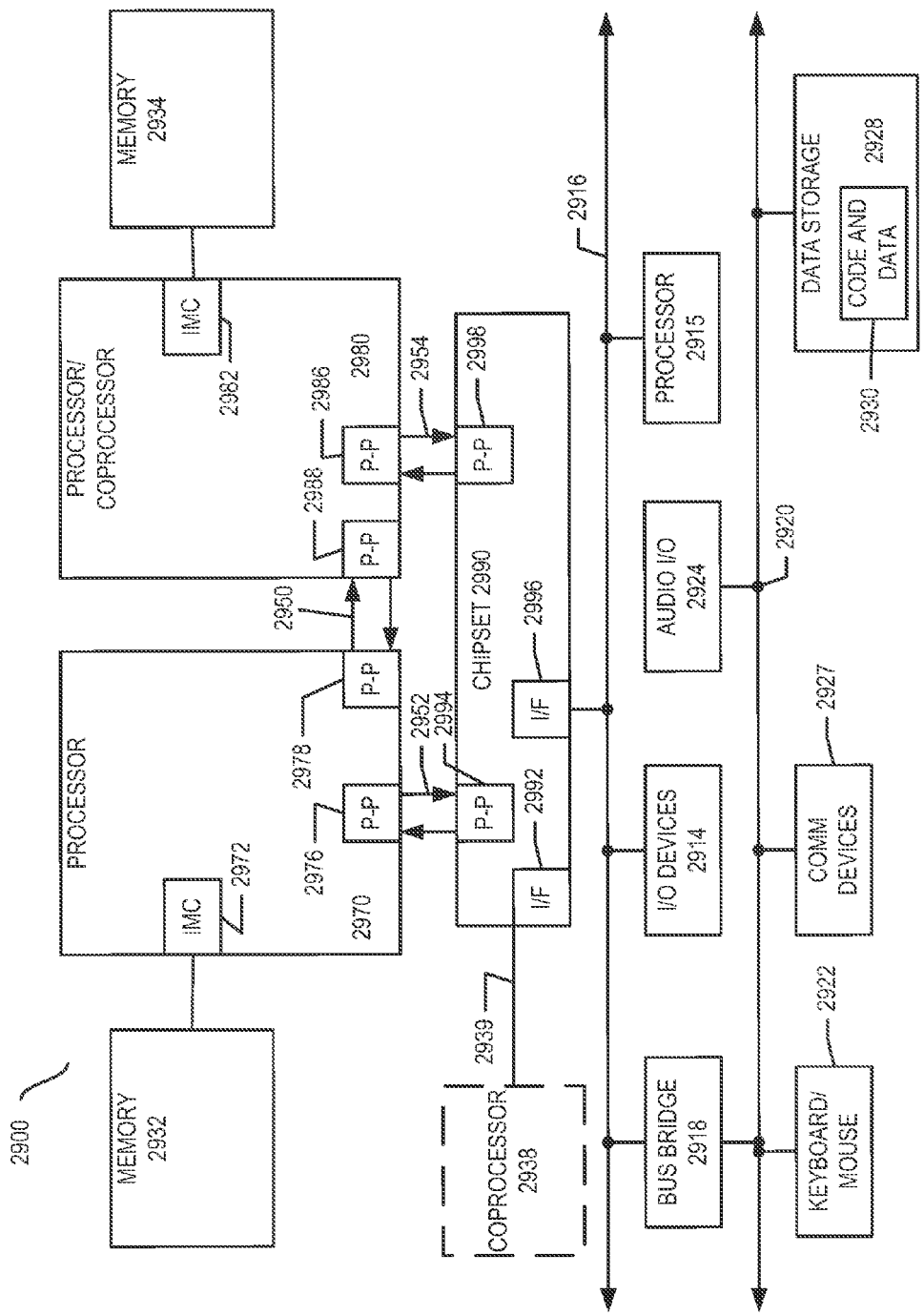
FIG. 12 is a block diagram of a more specific exemplary system in accordance with an embodiment of the invention.

Referring now to FIG. 12, shown is a block diagram of a first more specific exemplary system 2900 in accordance with an embodiment of the present invention. As shown in FIG. 12, multiprocessor system 2900 is a point-to-point interconnect system, and includes a first processor 2970 and a second processor 2980 coupled via a point-to-point interconnect 2950. Each of processors 2970 and 2980 may be some version of the processor 2700. In one embodiment of the invention, processors 2970 and 2980 are respectively processors 2810 and 2815, while coprocessor 2938 is coprocessor 2845. In another embodiment, processors 2970 and 2980 are respectively processor 2810 coprocessor 2845.

Processors 2970 and 2980 are shown including integrated memory controller (IMC) units 2972 and 2982, respectively. Processor 2970 also includes as part of its bus controller units point-to-point (P-P) interfaces 2976 and 2978; similarly, second processor 2980 includes P-P interfaces 2986 and 2988. Processors 2970, 2980 may exchange information via a point-to-point (P-P) interface 2950 using P-P interface circuits 2978, 2988. As shown in FIG. 12, IMCs 2972 and 2982 couple the processors to respective memories, namely a memory 2932 and a memory 2934, which may be portions of main memory locally attached to the respective processors.

Processors 2970, 2980 may each exchange information with a chipset 2990 via individual P-P interfaces 2952, 2954 using point to point interface circuits 2976, 2994, 2986, 2998. Chipset 2990 may optionally exchange information with the coprocessor 2938 via a high-performance interface 2939. In one embodiment, the coprocessor 2938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2990 may be coupled to a first bus 2916 via an interface 2996. In one embodiment, first bus 2916 may be a Peripheral Component Interconnect (PCI) bus, or a bus such as a PCI Express bus or another third generation I/O interconnect bus, although the scope of the present invention is not so limited.

As shown in FIG. 12, various I/O devices 2914 may be coupled to first bus 2916, along with a bus bridge 2918 which couples first bus 2916 to a second bus 2920. In one embodiment, one or more additional processor(s) 2915, such as coprocessors, high-throughput MIC processors, GPGPU's, accelerators (such as, e.g., graphics accelerators or digital signal processing (DSP) units), field programmable gate arrays, or any other processor, are coupled to first bus 2916. In one embodiment, second bus 2920 may be a low pin count (LPC) bus. Various devices may be coupled to a second bus 2920 including, for example, a keyboard and/or mouse 2922, communication devices 2927 and a storage unit 2928 such as a disk drive or other mass storage device which may include instructions/code and data 2930, in one embodiment. Further, an audio I/O 2924 may be coupled to the second bus 2920. Note that other architectures are possible. For example, instead of the point-to-point architecture of FIG. 12, a system may implement a multi-drop bus or other such architecture.

Figure 13:
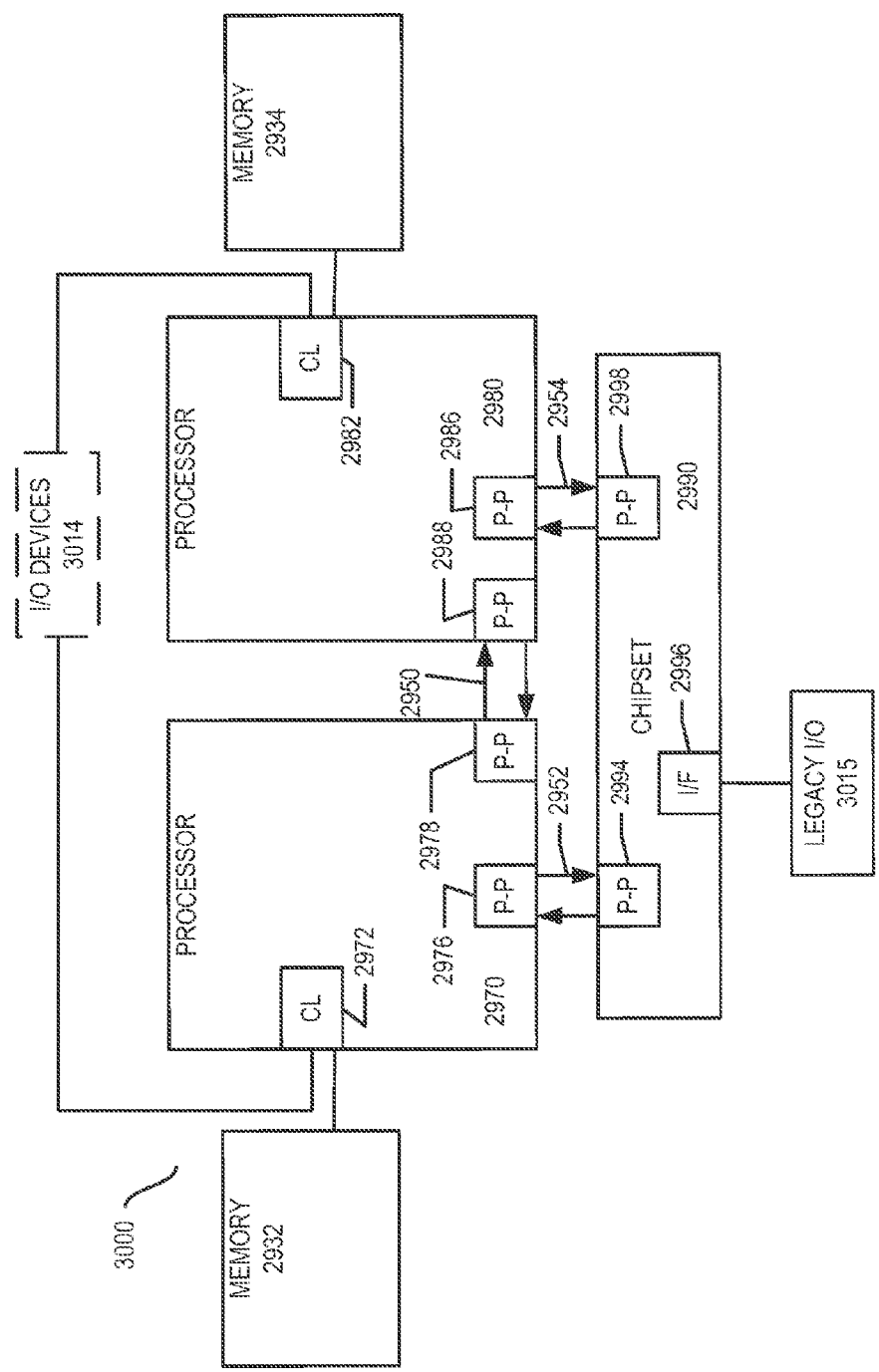
FIG. 13 is a block diagram of a more specific exemplary system in accordance with another embodiment of the invention.

Referring now to FIG. 13, shown is a block diagram of a second more specific exemplary system 3000 in accordance with an embodiment of the present invention. Like elements in FIG. 13 and FIG. 14 bear like reference numerals, and certain aspects of FIG. 12 have been omitted from FIG. 13 in order to avoid obscuring other aspects of FIG. 13. FIG. 13 illustrates that the processors 2970, 2980 may include integrated memory and I/O control logic ("CL") 2972 and 2982, respectively. Thus, the CL 2972, 2982 include integrated memory controller units and include I/O control logic. FIG. 13 illustrates that not only are the memories 2932, 2934 coupled to the CL 2972, 2982, but also that I/O devices 3014 are also coupled to the control logic 2972, 2982. Legacy I/O devices 3015 are coupled to the chipset 2990.

Figure 14:
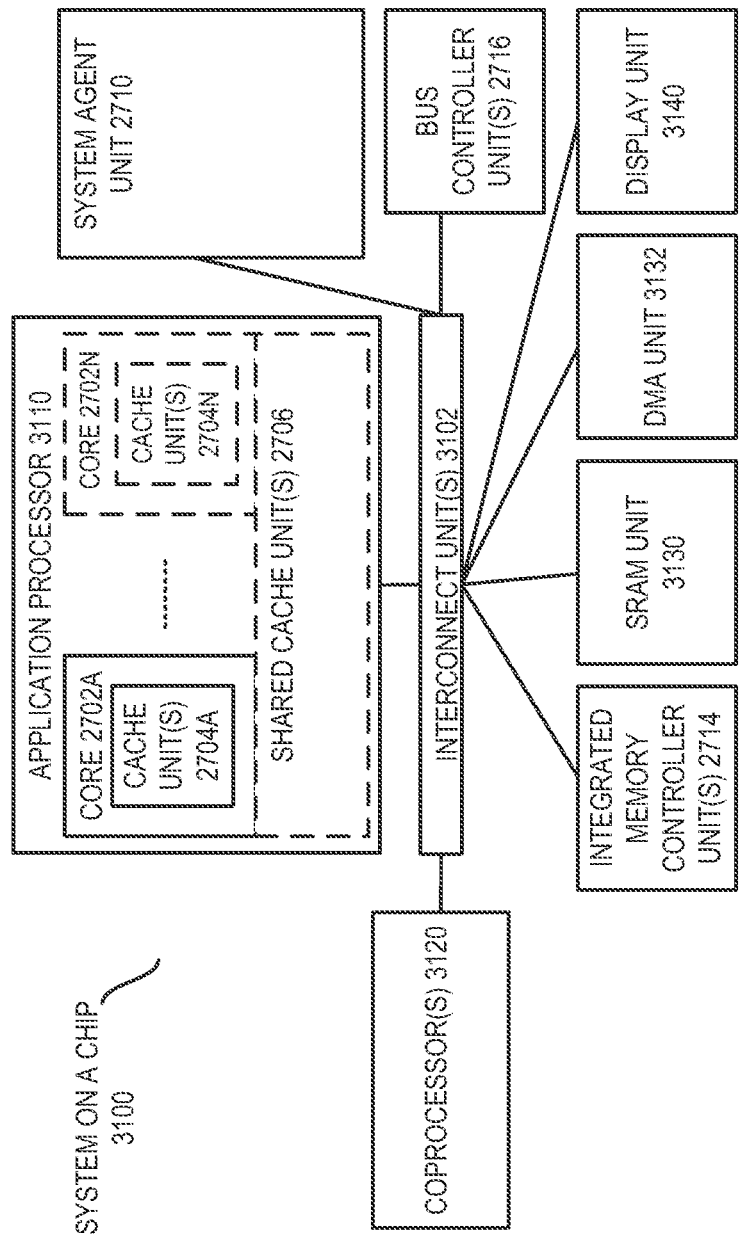
FIG. 14 is a block diagram of a SoC in accordance with an embodiment of the invention.

Referring now to FIG. 14, shown is a block diagram of a SoC 3100 in accordance with an embodiment of the present invention. Similar elements in FIG. 10 bear like reference numerals. Also, dashed lined boxes are optional features on more advanced SoCs. In FIG. 14, an interconnect unit(s) 3102 is coupled to: an application processor 3110 which includes a set of one or more cores 202A-N and shared cache unit(s) 2706; a system agent unit 2710; a bus controller unit(s) 2716; an integrated memory controller unit(s) 2714; a set or one or more coprocessors 3120 which may include integrated graphics logic, an image processor, an audio processor, and a video processor; an static random access memory (SRAM) unit 3130; a direct memory access (DMA) unit 3132; and a display unit 3140 for coupling to one or more external displays. In one embodiment, the coprocessor(s) 3120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2930 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
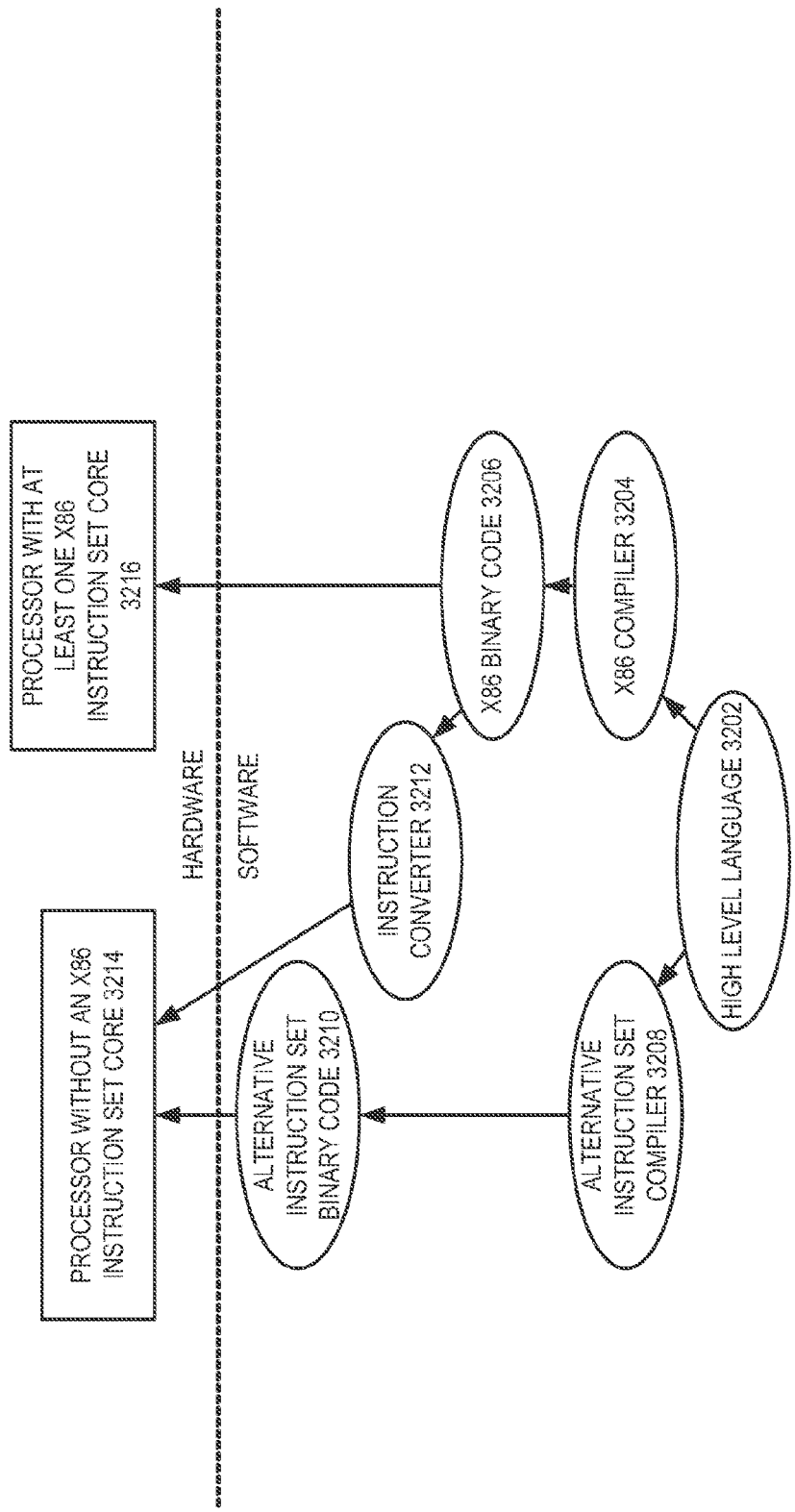
FIG. 15 is a block diagram contrasting the use of a software instruction converter to convert binary instructions in a source instruction set to binary instructions in a target instruction set according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 3202 may be compiled using an x86 compiler 3204 to generate x86 binary code 3206 that may be natively executed by a processor with at least one x86 instruction set core 3216. The processor with at least one x86 instruction set core 3216 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 3204 represents a compiler that is operable to generate x86 binary code 3206 (e.g., object code) that can, with or without additional linkage processing, be executed on the processor with at least one x86 instruction set core 3216. Similarly, FIG. 15 shows the program in the high level language 3202 may be compiled using an alternative instruction set compiler 3208 to generate alternative instruction set binary code 3210 that may be natively executed by a processor without at least one x86 instruction set core 3214 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3212 is used to convert the x86 binary code 3206 into code that may be natively executed by the processor without an x86 instruction set core 3214. This converted code is not likely to be the same as the alternative instruction set binary code 3210 because an instruction converter capable of this is difficult to make; however, the converted code will accomplish the general operation and be made up of instructions from the alternative instruction set. Thus, the instruction converter 3212 represents software, firmware, hardware, or a combination thereof that, through emulation, simulation or any other process, allows a processor or other electronic device that does not have an x86 instruction set processor or core to execute the x86 binary code 3206.

According to one embodiment, a processor includes a frontend unit having an instruction decoder to receive and to decode instructions of a plurality of threads; an execution unit coupled to the instruction decoder to receive and execute the decoded instructions; and an instruction retirement unit having a retirement logic to receive the instructions from the execution unit and to retire the instructions associated with one or more of the threads that have an instruction or an event pending to be retired, the instruction retirement unit including a multiplexed thread selection or thread arbitration logic to select or arbitrate one of the threads at a time and to dispatch the selected thread to the retirement logic for retirement processing.

The retirement logic of the retirement unit processes instructions of all of the threads in a serialized manner, and wherein the retirement logic is shared by all of the threads without having to maintain separate retirement logic for each of the threads individually. The multiplexed thread arbitration logic is a time multiplexed thread selection logic that is adapted to select a thread based on pending time of the thread. The multiplexed thread selection logic includes a least-recently-used (LRU) unit to keep track pending time of each of the threads, and wherein the LRU unit is adapted to cause the multiplexed thread selection logic to select a thread that has been pending for more than a predetermined number of processing cycles.

The retirement unit further comprises an event detector to detect a first event of a first thread that requires remaining threads to flush their operations; and a state control logic to suspend processing of the first thread and to initiate an all-thread flush (AT-flush) protocol to allow the remaining threads to flush their operations, while the first thread is being suspended. The state control logic is adapted to send a first signal to an instruction sequencer of the front end unit to suspend processing instruction associated with the first thread, post a virtual AT-flush event to each of the remaining threads, and wait for the virtual AT-flush event of each of the remaining threads to be processed through a plurality of processing stages of the retirement unit. The state control logic is adapted to send a second signal to a memory execution unit to perform a memory drain operation, in response to determining that all virtual AT-flush events of the remaining threads have been processed through the processing stages of the retirement unit, cause an active thread vector to be recomputed representing one or more of the threads that are active threads, and send the active thread vector to the front end unit to allow the front end unit to process instructions of the active threads, prior to processing instructions of an inactive thread.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
   a frontend unit having an instruction decoder to receive and to decode instructions of a plurality of threads;
   an execution unit coupled to the instruction decoder to receive and execute the decoded instructions; and
   an instruction retirement unit to receive the instructions from the execution unit and to retire the instructions associated with one or more of the threads that have an instruction or an event pending to be retired, the instruction retirement unit including a thread arbitration logic to select one of the threads at a time and to perform retirement processing on the selected thread, wherein the instruction retirement unit comprises:
      an event detector to detect a first event of a first thread that requires remaining threads to flush their operations, and
      a state control logic to:
         suspend processing of the first thread and to initiate an all-thread flush (AT-flush) protocol to allow the remaining threads to flush their operations, while the first thread is being suspend,
         send a first signal to an instruction sequencer of the front end unit to suspend processing instruction associated with the first thread,
         post a virtual AT-flush event to each of the remaining threads, and
         wait for the virtual AT-flush event of each of the remaining threads to be processed through a plurality of processing stages of the retirement unit.

2. The processor of claim 1, wherein the retirement unit is to process instructions of all of the threads in a serialized manner, and wherein the retirement logic is shared by all of the threads without having to maintain separate retirement logic for each of the threads individually.

3. The processor of claim 1, wherein the thread arbitration logic is a time multiplexed thread selection logic that is adapted to select a thread based on pending time of the thread.

4. The processor of claim 3, wherein the thread arbitration logic includes a least-recently-used (LRU) unit to keep track pending time of each of the threads, and wherein the LRU unit is adapted to cause the thread arbitration logic to select a thread that has been pending for more than a predetermined number of processing cycles.

5. The processor of claim 1, wherein the state control logic is adapted to
   send a second signal to a memory execution unit to perform a memory drain operation, in response to determining that all virtual AT-flush events of the remaining threads have been processed through the processing stages of the retirement unit,
   cause an active thread vector to be recomputed representing one or more of the threads that are active threads, and
   send the active thread vector to the front end unit to allow the front end unit to process instructions of the active threads.

6. A method, comprising:
receiving and decoding instructions of a plurality of threads by a frontend unit having an instruction decoder;
executing by an execution unit coupled to the instruction decoder the decoded instructions;
retiring the instructions associated with one or more of the threads that have an instruction or an event pending to be retired by an instruction retirement unit, the instruction retirement unit including a thread arbitration logic to select one of the threads at a time and to perform retirement processing on the selected thread;
detecting by an event detector a first event of a first thread that requires remaining threads to flush their operations;
sending a first signal to an instruction sequencer of the front end unit to suspend processing instruction associated with the first thread;
posting a virtual AT-flush event to each of the remaining threads; and
waiting for the virtual AT-flush event of each of the remaining threads to be processed through a plurality of processing stages of the retirement unit;
suspending processing of the first thread by a state control logic to initiate an all-thread flush (AT-flush) protocol to allow the remaining threads to flush their operations, while the first thread is being suspended.

7. The method of claim 6, wherein the retirement unit is to process instructions of all of the threads in a serialized manner, and wherein the retirement logic is shared by all of the threads without having to maintain separate retirement logic for each of the threads individually.

8. The method of claim 6, wherein the thread arbitration logic is a time multiplexed thread selection logic that is adapted to select a thread based on pending time of the thread.

9. The method of claim 8, wherein the thread arbitration logic includes a least-recently-used (LRU) unit to keep track pending time of each of the threads, and wherein the LRU unit is adapted to cause the thread arbitration logic to select a thread that has been pending for more than a predetermined number of processing cycles.

10. The method of claim 6, further comprising:
sending a second signal to a memory execution unit to perform a memory drain operation, in response to determining that all virtual AT-flush events of the remaining threads have been processed through the processing stages of the retirement unit;
causing an active thread vector to be recomputed representing one or more of the threads that are active threads; and
sending the active thread vector to the front end unit to allow the front end unit to process instructions of the active threads.

11. A data processing system comprising:
an interconnect;
a dynamic random access memory (DRAM) coupled to the interconnect; and
a processor coupled the interconnect, the processor including
a frontend unit having an instruction decoder to receive and to decode instructions of a plurality of threads,
an execution unit coupled to the instruction decoder to receive and execute the decoded instructions, and
an instruction retirement unit to receive the instructions from the execution unit and to retire the instructions associated with one or more of the threads that have an instruction or an event pending to be retired, the instruction retirement unit including a thread arbitration logic to select one of the threads at a time and to perform retirement processing on the selected thread, wherein the instruction retirement unit comprises:
an event detector to detect a first event of a first thread that requires remaining threads to flush their operations, and
a state control logic to:
suspend processing of the first thread and to initiate an all-thread flush (AT-flush) protocol to allow the remaining threads to flush their operations, while the first thread is being suspend,
send a first signal to an instruction sequencer of the front end unit to suspend processing instruction associated with the first thread,
post a virtual AT-flush event to each of the remaining threads, and
wait for the virtual AT-flush event of each of the remaining threads to be processed through.

12. The system of claim 11, wherein retirement unit is to process instructions of all of the threads in a serialized manner, and wherein the retirement logic is shared by all of the threads without having to maintain separate retirement logic for each of the threads individually.

13. The system of claim 11, wherein the thread arbitration logic is a time multiplexed thread selection logic that is adapted to select a thread based on pending time of the thread.

14. The system of claim 13, wherein the thread arbitration logic includes a least-recently-used (LRU) unit to keep track pending time of each of the threads, and wherein the LRU unit is adapted to cause the thread arbitration logic to select a thread that has been pending for more than a predetermined number of processing cycles.

15. The system of claim 11, wherein the state control logic is adapted to
send a second signal to a memory execution unit to perform a memory drain operation, in response to determining that all virtual AT-flush events of the remaining threads have been processed through the processing stages of the retirement unit,
cause an active thread vector to be recomputed representing one or more of the threads that are active threads, and
send the active thread vector to the front end unit to allow the front end unit to process instructions of the active threads.

* * * * *